United States Patent
Kim et al.

(10) Patent No.: US 8,929,477 B2
(45) Date of Patent: Jan. 6, 2015

(54) DATA TRANSFERRING DEVICE, DATA TRANSFERRING METHOD AND DATA RECEIVING METHOD

(75) Inventors: Jaeseok Kim, Seoul (KR); Junha Im, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 145 days.

(21) Appl. No.: 13/370,387

(22) Filed: Feb. 10, 2012

(65) Prior Publication Data

US 2012/0213304 A1 Aug. 23, 2012

(30) Foreign Application Priority Data

Feb. 17, 2011 (KR) .................. 10-2011-0014181
Aug. 1, 2011 (KR) .................. 10-2011-0076729
Aug. 1, 2011 (KR) .................. 10-2011-0076730

(51) Int. Cl.
*H04L 27/26* (2006.01)
*H04L 5/00* (2006.01)

(52) U.S. Cl.
CPC .............. *H04L 5/0046* (2013.01); *H04L 5/006* (2013.01); *H04L 27/2633* (2013.01); *H04L 27/2647* (2013.01); *H04L 27/2634* (2013.01)
USPC ....................................................... 375/295

(58) Field of Classification Search
USPC .................................................. 375/295, 147
See application file for complete search history.

(56) References Cited

U.S. PATENT DOCUMENTS

| 7,054,375 | B2* | 5/2006 | Kannan et al. ................. 375/260 |
| 2003/0193970 | A1* | 10/2003 | Kim et al. ...................... 370/509 |
| 2004/0057502 | A1* | 3/2004 | Azenkot et al. ................ 375/147 |
| 2004/0109515 | A1* | 6/2004 | Krauss et al. .................. 375/316 |
| 2007/0082633 | A1* | 4/2007 | Carbone et al. ............. 455/166.2 |
| 2007/0249298 | A1* | 10/2007 | Sawada .......................... 455/103 |
| 2008/0310548 | A1* | 12/2008 | Thesling ........................ 375/296 |
| 2009/0219802 | A1* | 9/2009 | Han et al. ....................... 370/210 |
| 2009/0316820 | A1* | 12/2009 | Yang .............................. 375/267 |
| 2010/0177847 | A1 | 7/2010 | Woodward |
| 2011/0003551 | A1* | 1/2011 | Kameno et al. ................. 455/62 |
| 2011/0070850 | A1* | 3/2011 | Kwon et al. ................... 455/129 |
| 2011/0110467 | A1* | 5/2011 | Maltsev et al. ................ 375/340 |
| 2012/0182948 | A1* | 7/2012 | Huang et al. .................. 370/329 |

FOREIGN PATENT DOCUMENTS

| JP | 11-017644 A | 1/1999 |
| JP | 2009-516416 A | 4/2009 |
| KR | 10-0981514 A | 7/2006 |

(Continued)

OTHER PUBLICATIONS

Im et al., "High-speed Multicarrier Transmission Scheme for Implantable Medical Devices", IEICE 2011, vol. 8, No. 3, pp. 143-148.

*Primary Examiner* — Jaison Joseph
(74) *Attorney, Agent, or Firm* — Carter, DeLuca, Farrell & Schmidt, LLP

(57) ABSTRACT

Disclosed is a data transmitting device which includes an input symbol mapping unit converting serial data symbols to parallel data symbols and generating null signals; and a conversion unit converting the parallel data symbols and the null signals to a plurality of subcarriers and a plurality of null subcarriers using sub frequency bands overlapped with one another, wherein the plurality of subcarriers is transformed using sub frequency bands separated from one another.

14 Claims, 31 Drawing Sheets

(56) References Cited

FOREIGN PATENT DOCUMENTS

| KR | 10-0825739 A | 5/2007 |
| KR | 10-2008-0031554 A | 4/2008 |
| KR | 10-2009-0042966 A | 5/2009 |
| KR | 10-2010-0004034 A | 1/2010 |
| KR | 10-2010-0101938 A | 9/2010 |

* cited by examiner

Fig. 4

| Input Point | Mapped Data Symbol |
|---|---|
| 1 | PDS1 |
| 2 | 0 |
| 3 | PDS2 |
| 4 | 0 |
| 5 | 0 |
| 6 | 0 |
| 7 | PDS3 |
| 8 | 0 |
| 9 | PDS4 |
| 10 | 0 |
| 11 | PDS5 |
| 12 | 0 |
| 13 | PDS6 |
| 14 | 0 |
| 15 | PDS7 |
| 16 | 0 |
| 17 | PDS8 |
| 18 | 0 |
| 19 | PDS9 |
| 20 | 0 |

Fig. 6

| Input Point | Mapped Data Symbol |
|---|---|
| 1 | PDS1 |
| 2 | 0 |
| 3 | PDS2 |
| 4 | 0 |
| 5 | 0 |
| 6 | 0 |
| 7 | PDS3 |
| 8 | 0 |
| 9 | PDS4 |
| 10 | 0 |
| 11 | PDS5 |
| 12 | 0 |
| 13 | PDS6 |
| 14 | 0 |
| 15 | PDS7 |
| 16 | 0 |

Fig. 9

| Input Point | Mapped Data Symbol |
|---|---|
| 1 | 0 |
| 2 | PDS1 |
| 3 | 0 |
| 4 | 0 |
| 5 | 0 |
| 6 | PDS2 |
| 7 | 0 |
| 8 | 0 |
| 9 | 0 |
| 10 | 0 |
| 11 | 0 |
| 12 | 0 |
| 13 | 0 |
| 14 | PDS3 |
| 15 | 0 |
| 16 | 0 |
| 17 | 0 |
| 18 | PDS4 |
| 19 | 0 |
| 20 | 0 |

．
．
．

| | |
|---|---|
| 29 | 0 |
| 30 | PDS7 |
| 31 | 0 |
| 32 | 0 |

Fig. 11

| Input Point | Mapped Data Symbol |
|---|---|
| 1 | 0 |
| 2 | 0 |
| 3 | 0 |
| 4 | 0 |
| 5 | 0 |
| 6 | 0 |
| 7 | PDS1 |
| 8 | 0 |
| 9 | PDS2 |
| 10 | 0 |
| 11 | 0 |
| 12 | 0 |

. . .

| Input Point | Mapped Data Symbol |
|---|---|
| 23 | PDS8 |
| 24 | 0 |
| 25 | PDS9 |
| 26 | 0 |
| 27 | 0 |
| 28 | 0 |
| 29 | 0 |
| 30 | 0 |
| 31 | 0 |
| 32 | 0 |

Fig. 14

| AC | Output of allotment unit | SS | BW1(MHz) | BW2(MHz) |
|---|---|---|---|---|
| 00 | Parallel data symbols according to a table in FIG. 6 | 0 | 0.9 ~ 3.3 | ✕ |
| 01 | Parallel data symbols according to a table in FIG. 9 | 1 | ✕ | 0.9 ~ 3.3 |
| 10 | Parallel data symbols according to a table in FIG. 11 | 1 | ✕ | 0 ~ 4.8 |

Fig. 18

| Input Point | Mapped Data Symbol |
|---|---|
| 1 | PDS1 |
| 2 | 0 |
| 3 | PDS2 |
| 4 | 0 |
| 5 | 0 |
| 6 | 0 |
| 7 | PDS3 |
| 8 | 0 |
| 9 | PDS4 |
| 10 | 0 |
| 11 | PDS5 |
| 12 | 0 |
| 13 | PDS6 |
| 14 | 0 |
| 15 | PDS7 |
| 16 | 0 |

Fig. 21

| Input Point | Mapped Data Symbol |
|---|---|
| 1 | 0 |
| 2 | PDS1 |
| 3 | 0 |
| 4 | 0 |
| 5 | 0 |
| 6 | PDS2 |
| 7 | 0 |
| 8 | 0 |
| 9 | 0 |
| 10 | 0 |
| 11 | 0 |
| 12 | 0 |
| 13 | 0 |
| 14 | PDS3 |
| 15 | 0 |
| 16 | 0 |
| 17 | 0 |
| 18 | PDS4 |
| 19 | 0 |
| 20 | 0 |

⋮

| | |
|---|---|
| 29 | 0 |
| 30 | PDS7 |
| 31 | 0 |
| 32 | 0 |

Fig. 23

| Input Point | Mapped Data Symbol |
|---|---|
| 1 | 0 |
| 2 | 0 |
| 3 | 0 |
| 4 | 0 |
| 5 | 0 |
| 6 | 0 |
| 7 | PDS1 |
| 8 | 0 |
| 9 | PDS2 |
| 10 | 0 |
| 11 | 0 |
| 12 | 0 |

. . .

| Input Point | Mapped Data Symbol |
|---|---|
| 23 | PDS8 |
| 24 | 0 |
| 25 | PDS9 |
| 26 | 0 |
| 27 | 0 |
| 28 | 0 |
| 29 | 0 |
| 30 | 0 |
| 31 | 0 |
| 32 | 0 |

Fig. 26

| AC | Output of allotment unit | SS | BW1(MHz) | BW2(MHz) |
|----|---|----|----|----|
| 00 | Parallel data symbols according to a table in FIG. 18 | 0 | 0.9 ~ 3.3 | ✕ |
| 01 | Parallel data symbols according to a table in FIG. 21 | 1 | ✕ | 0.9 ~ 3.3 |
| 10 | Parallel data symbols according to a table in FIG. 23 | 1 | ✕ | 0 ~ 4.8 |

DATA TRANSFERRING DEVICE, DATA TRANSFERRING METHOD AND DATA RECEIVING METHOD

CROSS-REFERENCE TO RELATED APPLICATIONS

A claim for priority under 35 U.S.C. §119 is made to Korean Patent Application Nos. 10-2011-00014181 filed Feb. 17, 2011, 10-2011-0076729 filed Aug. 1, 2011, and 10-2011-0076730 filed Aug. 1, 2011, the entirety of which is incorporated by reference herein.

BACKGROUND

The inventive concepts described herein relate to a data transmitting device in wireless communication, and more particularly, relate to a data transmitting and receiving device transmitting and receiving data in the Orthogonal Frequency Division Multiplexing (OFDM) manner and a method thereof.

In the MICS (Medical Implant Communications Service) protocol, the wireless communication may be made using a frequency band ranging from 402 MHz to 405 MHz (hereinafter, referred to as an MICS band). A radio wave transmission property of the MICS band may be excellent. Since the MICS band suffers less interference from other communication systems, many internal medical devices may make wireless communication using the frequency band.

For communication apparatuses using the MICS protocol, an interval between subcarriers used to transmit data may maintain 300 KHz, and subcarriers may not be overlapped. A lobe, escaping from a corresponding frequency channel, from among lobes of a subcarrier transferred via one frequency channel may be maintained below −20 dB compared with a peak value.

The MICS band may be divided into 10 frequency channels. An electronic apparatus using a conventional MICS protocol may communicate using one frequency channel of 10 frequency channels. In this case, a frequency band of 300 KHz may be provided in maximum. However, in case that the amount of data to be transmitted is large, a wider frequency band may be required. For example, if a medical apparatus requiring transmission of image information follows the MICS protocol, a frequency band larger than 300 KHz may be required to improve the transmission rate.

SUMMARY

Example embodiments of the inventive concept provide a data transmitting device comprising an input symbol mapping unit converting serial data symbols to parallel data symbols and generating null signals; and a conversion unit converting the parallel data symbols and the null signals to a plurality of subcarriers and a plurality of null subcarriers using sub frequency bands overlapped with one another, wherein the plurality of subcarriers is transformed using sub frequency bands separated from one another.

Example embodiments of the inventive concept also provide a data transmitting device comprising a detection block detecting a frequency band, occupied at the exterior, from among frequency channels; and a data transmitting block converting data symbols according to an OFDM manner to generate subcarriers, wherein the data transmitting block generates the subcarriers using sub frequency bands excepting the detected frequency band, the data symbols and null signals being together converted such that main lobes of the subcarriers are not overlapped.

Example embodiments of the inventive concept also provide a data transmitting method comprising converting a plurality of data symbols to a plurality of subcarriers according to an OFDM manner; and transmitting the plurality of subcarriers, wherein the plurality of data symbols is converted to the plurality of subcarriers using separated frequency channels.

Example embodiments of the inventive concept also provide a method of receiving an OFDM signal, the method comprising receiving a request signal including frequency channel information; judging frequency channels, corresponding to the frequency channel information, from among a plurality of frequency channels; and generating a plurality of bit streams based on subcarriers received via the judged frequency channels when a plurality of subcarriers is received.

BRIEF DESCRIPTION OF THE FIGURES

The above and other objects and features will become apparent from the following description with reference to the following figures, wherein like reference numerals refer to like parts throughout the various figures unless otherwise specified, and wherein

FIG. 4 is a diagram illustrating signals input to input points of an inverse Fourier transform unit.

FIG. 6 is a diagram illustrating signals input via input points of an inverse Fourier transform unit in FIG. 5.

FIG. 9 is a diagram describing signals input via input points of an inverse Fourier transform unit in FIG. 8.

FIG. 11 is a diagram describing signals input via input points (e) of an inverse Fourier transform unit in FIG. 8.

FIG. 14 is a diagram control signals generated from a control unit in FIG. 1.

FIG. 18 is a diagram illustrating signals input via input points of an inverse Fourier transform unit.

FIG. 21 is a diagram illustrating signals input via input points of an inverse Fourier transform unit in FIG. 20.

FIG. 23 is a diagram describing signals input via input points of an inverse Fourier transform unit in FIG. 20 according to another embodiment of the inventive concept.

FIG. 26 is a diagram control signals generated from a control unit in FIG. 16.

DETAILED DESCRIPTION

Figure 1:
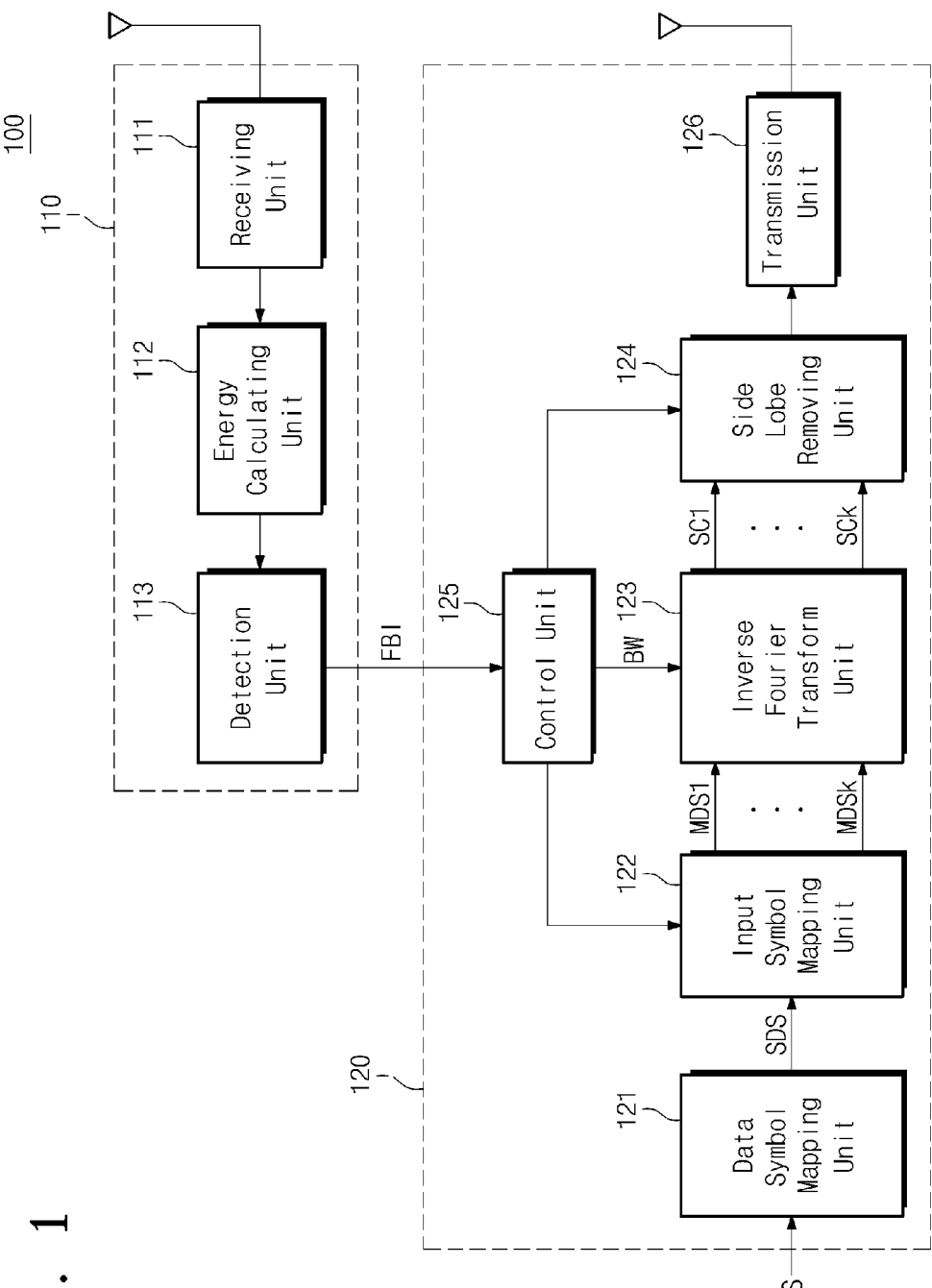
FIG. 1 is a block diagram schematically illustrating a data transmitting device according to an embodiment of the inventive concept.

The inventive concept is described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Terms "unit", "block", "module", and the like may be used to indicate a unit of processing at least one function or operation. For example, such terms unit", "block", and "module" may mean software, or a hardware element such as ASIC or FPGA. However, such terms are not limited to software or hardware. The "unit", "block", and "module" may be configured to be included within an addressable storage medium or to operate one or more processors. Thus, "unit", "block", and "module" may include constituent elements such as software elements, Object. Oriented software elements, class elements, and task elements, processes, functions, attributes, procedures, sub-routines, segments of program code, drivers, firmware, micro code circuit, data, database, data structures, tables, arrays, and variables. Elements and functions provided within the "unit", "block", and "module" may be jointed to reduce the number of elements and the "unit", "block", and "module", or may be additionally divided into elements and "unit", "block", and "module".

FIG. 1 is a block diagram schematically illustrating a data transmitting device according to an embodiment of the inventive concept. Referring to FIG. 1, a data transmitting device 100 may include a detection block 110 and a data transmitting block 120.

The detection block 110 may detect a sub frequency band including a radio frequency signal occupied (or, used) at the outside. The detection block 110 may transfer information on the detected sub frequency band FBI to a control unit 125.

The detection block 110 may include a receiving unit 111, an energy calculating unit 112, and a detection unit 113. The receiving unit 111 may receive a radio frequency (RF) signal from the outside. The receiving unit 111 may select a predetermined frequency band (e.g., the whole of an MICS band) of received RF signals. An RF signal in the selected band may be sent to the energy calculating unit 112.

In example embodiments, the receiving unit 111 may include one of low pass filters, high pass filters, band pass filters, or a combination of at least two thereof.

The energy calculating unit 112 may receive an RF signal from the receiving unit 111. The energy calculating unit 112 may calculate an energy value of each of a plurality of sub frequency bands. One sub frequency band may mean a frequency domain where one subcarrier (e.g., one of SC1 to SC20) is placed.

In example embodiments, an energy value of a sub frequency band including an RF signal may be larger than that of a sub frequency band not including an RF signal. For example, the energy calculating unit 112 may calculate an energy value of each sub frequency band by calculating an absolute value (or, a square of absolute value) of an amplitude of an RF signal within each sub frequency band.

The detection unit 113 may detect a sub frequency band used at the outside using an energy value calculated by the energy calculating unit 112. In example embodiments, the detection unit 113 may detect a sub frequency band, having an energy value larger than a threshold value, from among energy values of sub frequency bands. Information on the detected sub frequency band FBI (hereinafter, referred to as sub frequency band information) may be sent to the control unit 125.

The data transmitting block 120 may convert data symbols into subcarriers according to the OFDM (Orthogonal Frequency Division Multiplexing) manner, and may transfer the subcarriers to the outside.

The data transmitting block 120 may include a data symbol mapping unit 121, an input symbol mapping 122, an inverse Fourier transform unit 123, a side lobe removing unit 124, a control unit 125, and a transmission unit 126.

The data symbol mapping unit 121 may receive serial bit streams BS. For example, the serial bit streams BS may include image data, voice data, text data, or combinations thereof. The data symbol mapping unit 121 may classify the serial bit streams BS into a plurality of groups, and may map the plurality of groups on a plurality of data symbols, respectively. Mapped data symbols may constitute serial data symbols SDS. The serial data symbols SDS may be sent to the input symbol mapping unit 122.

In example embodiments, the data symbol mapping unit 121 may generate the serial data symbols SDS by performing QPSK (Quadrature Phase Shift Keying), QAM (Quadrature Amplitude Modulation) or combinations thereof. For example, the data symbol mapping unit 121 may generate the serial data symbols SDS by making digital data constituting the serial bit streams BS correspond to four phases. For example, the data symbol mapping unit 121 may generate the serial data symbols SDS according to both ASK (Amplitude Shift Keying) and PSK (Phase Shift Keying).

The input symbol mapping unit 122 may operate responsive to the control of the control unit 125. The input symbol mapping unit 122 may receive the serial data symbols SDS to generate mapped symbols MDS1 to MDSk, which are transferred to input points (referring to reference symbol 'a' in FIG. 2) of the inverse Fourier transform unit 123.

The input symbol mapping unit 122 may convert the serial data symbols SDS into parallel data symbols. The input symbol mapping unit 122 may generate the mapped symbols MDS1 to MDSk using the parallel data symbols.

The input symbol mapping unit 122 may map a null signal on an input point corresponding to the sub frequency band information FBI. The input symbol mapping unit 122 may map null signals on a part of input points of the inverse Fourier transform unit 123 such that main lobes of subcarriers SC1 to SCk are not overlapped. The input symbol mapping unit 122 may map parallel data symbols on the remaining input points. For example, null signals and parallel data symbols may be mapped in turn, respectively.

The inverse Fourier transform unit 123 may perform inverse Fourier transformation according to the control of the control unit 125. The inverse Fourier transform unit 123 may receive bandwidth information BW from the control unit 125. Inverse Fourier transformation may be made within a bandwidth corresponding to the bandwidth information BW. The inverse Fourier transform unit 123 may transform the mapped symbols MDS1 to MDSk into the subcarriers SC1 to SCk according to the OFDM manner, respectively. The mapped symbols MDS1 MDSk may be transformed using sub frequency bands that are overlapped one another. The subcarriers SC1 to SCk may be orthogonal to one another. In example embodiments, the subcarriers SC1 to SCk output from the inverse Fourier transform unit 123 may be signals within a baseband.

The subcarriers SC1 to SCk may constitute one OFDM symbol. In example embodiments, the inverse Fourier transform unit 123 may perform inverse Fourier transform according to the IFFT (Inverse Fast Fourier Transform) algorithm.

The side lobe removing unit 124 may operate according to the control of the control unit 125. The side lobe removing unit 124 may convert the parallel subcarriers SC1 to SCk into serial subcarriers. The serial subcarriers may constitute one OFDM symbol. The side lobe removing unit 124 may remove a side lobe of subcarriers included in the OFDM symbol. For example, a side lobe may mean the amplitude excepting a main lobe of each subcarrier. For example, the side lobe may mean the amplitude of a subcarrier that escapes from a sub frequency band including each subcarrier.

In example embodiments, the side lobe removing unit 124 may remove a side lobe by performing Guard Interval (GI) addition and windowing. For example, the side lobe removing unit 124 may add a prefix and a suffix as the guard interval to each of serial OFDM symbols that are continuous. The side lobe removing unit 124 may reduce an absolute value of the amplitude of each OFDM symbol by multiplying a windowing function with OFDM symbols to which the prefix and suffix are added. As an absolute value of the amplitude of each OFDM symbol is reduced, absolute values of subcarriers included in OFDM symbols may be reduced. As a result, side lobes of subcarriers included in OFDM symbols may be removed.

The transmission unit 126 may convert serial OFDM symbols, from which side lobes are removed, into signals of a high frequency band (e.g., a frequency of the MICS band), and may transfer the converted signals to the exterior. For example, the transmission unit 126 may increase a frequency of a serial OFDM symbol by 401.1 MHz.

Figure 2:
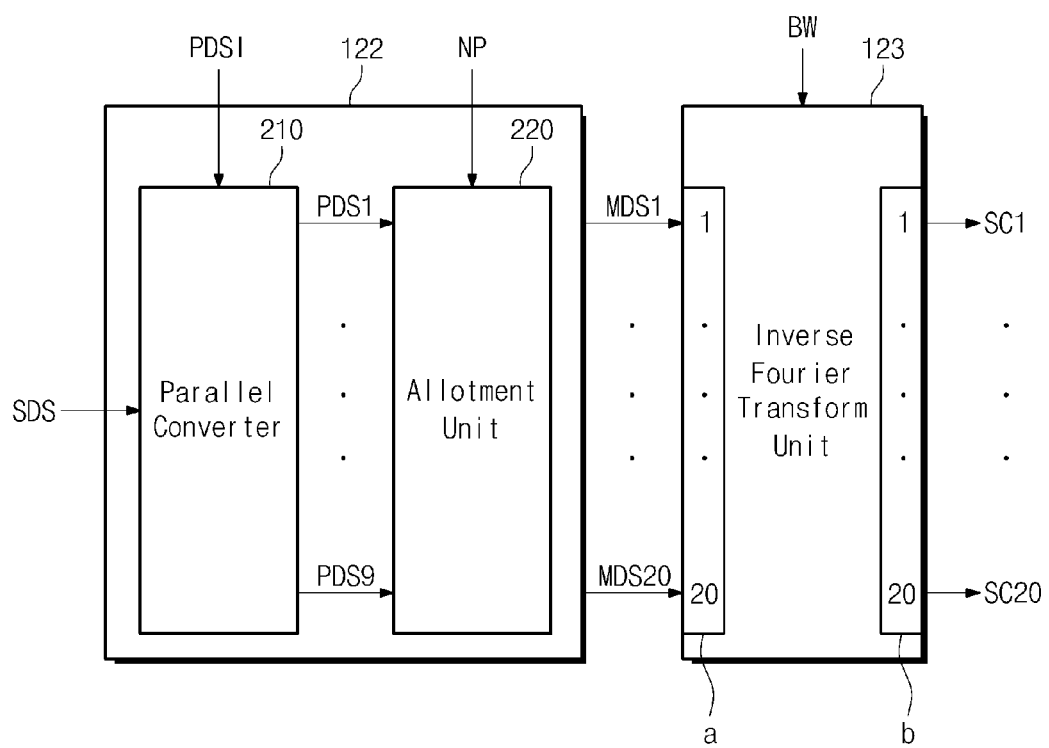
FIG. 2 is a block diagram schematically illustrating an input symbol mapping unit and an inverse Fourier transformation unit in FIG. 1.

FIG. 2 is a block diagram schematically illustrating an input symbol mapping unit and an inverse Fourier transformation unit in FIG. 1. Referring to FIG. 1, an inverse Fourier transformation unit 123 may have 20 input points (a) and 20 output points (b). In FIG. 2, a parallel converter 210 may generate 9 parallel data symbols PDS1 to PDS9.

Referring to FIGS. 1 and 2, an input symbol mapping unit 122 may include a parallel converter 210 and an allotment portion 220. The parallel converter 210 may receive serial data symbols SDS. The parallel converter 210 may receive number information of parallel data symbols PDSI from a control unit 125.

A maxim value indicated by number information of parallel data symbols PDSI may be the number of frequency channels (e.g., frequency channels included in a bandwidth from among an MISC band) of a bandwidth indicated by the bandwidth information BW other than frequency channels used at the exterior. For example, it is assumed that the inverse Fourier transform unit 123 may receive bandwidth information BW corresponding to 0.9 MHz to 3.3 MHz (402 MHz to 404.4 MHz in the MISC band) and perform inverse Fourier transform according to the input bandwidth information BW. 8 frequency channels CH1 to CH8 of the MICS band may be included within 402 MHz to 404.4 MHz. In case that a sub frequency band used at the exterior is included within a third frequency channel CH3 (i.e., one channel is detected), a maximum value of the number information of parallel data symbols PDSI may be 7.

The control unit 125 may generate the number information of parallel data symbols PDSI according to the input sub frequency band information FBI. In example embodiments, the control unit 125 may generate the number information of parallel data symbols PDSI according to the number of the remaining frequency channels of frequency channels of the MICS band other than a frequency channel corresponding to the sub frequency band information FBI.

The parallel converter 210 may convert serial data symbols SDS to parallel data symbols PDS1 to PDS9 according to the number information of parallel data symbols PDSI. At this time, the parallel converter 210 may classify continuously input serial data symbols SDS into a plurality of groups, and may convert each group to parallel data symbols PDS1 to PDS9.

The allotment portion 220 may receive first to ninth parallel data symbols PDS1 to PDS9. The allotment portion 220 may receive null point information NP from the control unit 125.

The allotment portion 220 may transmit a null signal to an input point corresponding to null point information NP from among the input points (a). The allotment portion 220 may provide a null signal to a part of input points other than an input point corresponding to null point information NP. The allotment portion 220 may provide the parallel data symbols PDS1 to PDS9 to a part of the remaining input points other than an input point corresponding to null point information NP. For example, the allotment portion 220 may provide a null signal and a parallel data symbol to each input point in turn.

Null point information NP may be provided based on sub frequency band information FBI. Null point information NP may be information on an input point. In example embodiments, sub frequency bands corresponding to the input points (a) may be calculated using a bandwidth value of bandwidth information BW and the number of input points. The control unit 125 may judge an input point corresponding to sub frequency band information FBI based on sub frequency bands corresponding to the input points (a). The control unit 125 may provide the allotment portion 220 with null point information NP being information on a detected input point.

The allotment portion 220 may transfer null signals to a part of the input points (a) respectively such that first to twentieth subcarriers SC1 to SC20 are not overlapped. The allotment portion 220 may transfer first to ninth parallel data symbols PDS1 to PDS9 to the remaining input points, respectively. Null signals from the allotment portion 220 and the first to ninth data symbols PDS1 to PDS9 may constitute first to twentieth mapped symbols MDS1 to MDS20.

The inverse Fourier transform unit 123 may receive the first to twentieth mapped symbols MDS1 to MDS20 via the first to twentieth input points (a), respectively. The inverse Fourier transform unit 123 may perform inverse Fourier transform on the first to twentieth mapped symbols MDS1 to MDS20 to generate first to twentieth subcarriers SC1 to SC20.

The first to twentieth input points (a) may correspond to a plurality of sub frequency bands, respectively. The inverse Fourier transform unit 123 may perform inverse Fourier transform on each mapped symbol on the basis of a sub frequency band corresponding to each input point. The inverse Fourier transform unit 123 may generate the first to twentieth subcarriers SC1 to SC20 via the first to twentieth output points (b), respectively.

In communication apparatuses to which the MICS protocol is to be applied, an interval between subcarriers used to transmit data (e.g., an interval between center frequencies of subcarriers used to transmit data) may maintain 300 KHz, and subcarriers may not be overlapped. A signal, escaping from a frequency channel, from among signals of subcarriers corresponding to frequency channels of the MICS band may be maintained below −20 dB compared with a peak value.

The subcarriers SC1 to SC20 generated from the inverse Fourier transform unit 123 may be orthogonal. Thus, in case that a null signal is not included within the mapped symbols MDS1 to MDS20, main lobes of the subcarriers SC1 to SC20 may be overlapped.

With an embodiment of the inventive concept, the allotment portion 220 may transfer a null signal to a part of input points such that main lobes of the subcarriers SC1 to SC20 are not overlapped. In example embodiments, the allotment portion 220 may transfer the first to ninth data symbols PDS1 to PDS9 and null signals to the input points (a) in turn.

A subcarrier made from inverse Fourier transformed null signals (hereinafter, referred to as a null subcarrier) may have a low amplitude. Thus, main lobes of the subcarriers SC1 to SC20 may not be overlapped according to the orthogonal characteristic of the subcarriers SC1 to SC20.

With an embodiment of the inventive concept, the allotment portion 220 may not allot parallel data symbols PDS1 to PDS9 to an input point, corresponding to sub frequency band information FBI, from among input points (a). The control unit 125 may control the allotment portion 220 such that a null signal is transferred to an input point corresponding to sub frequency band information FBI. Thus, for a data transmitting device 100, a frequency channel, corresponding to sub frequency band information FBI, from among channels of the MICS band may not be used to transmit data. As a result, when transferring data, the data transmitting device 100 may not use a frequency channel including a sub frequency band used at the exterior.

Figure 3:
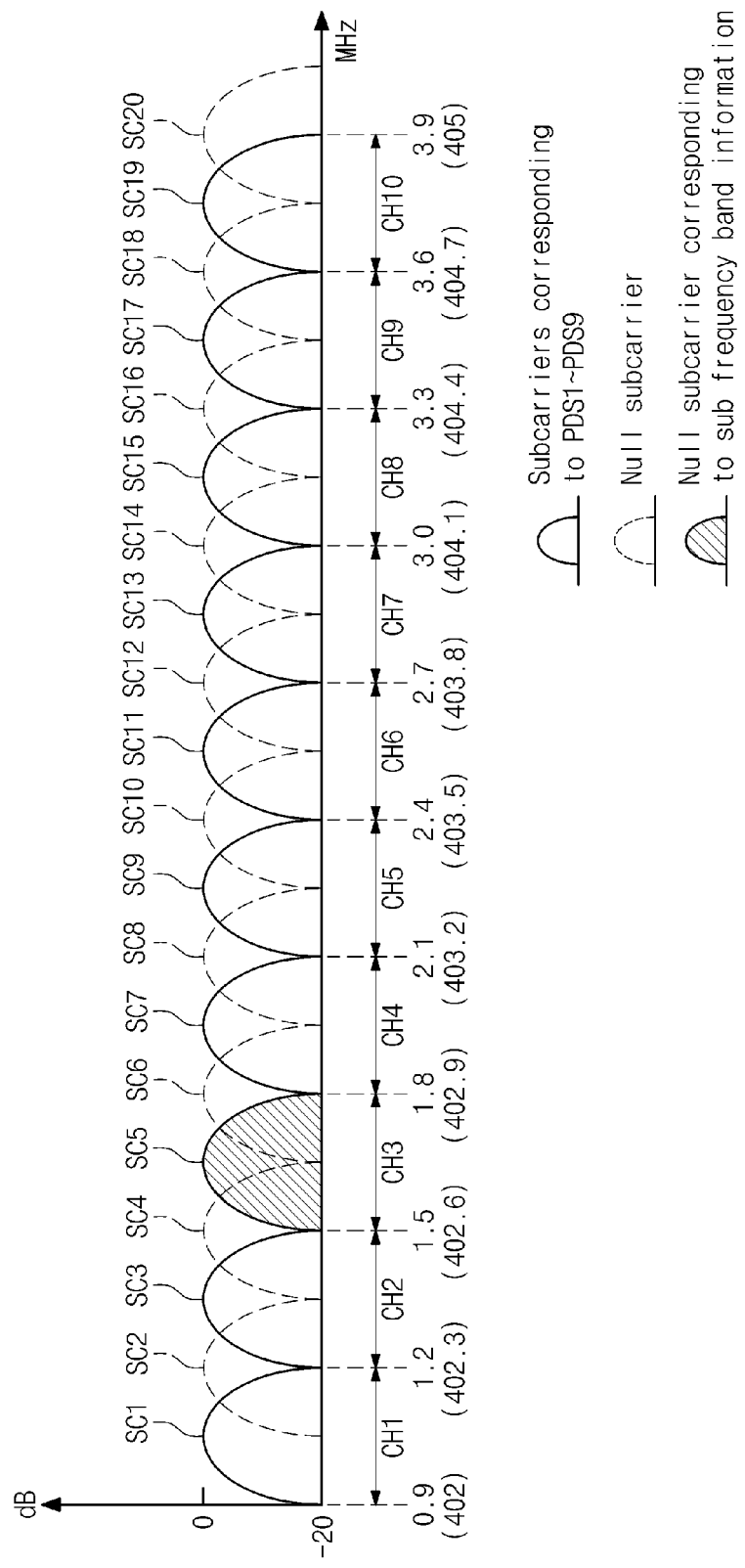
FIG. 3 is a diagram schematically illustrating frequency spectrums of first to twentieth subcarriers.

FIG. 3 is a diagram schematically illustrating frequency spectrums of first to twentieth subcarriers. Values in brackets may indicate frequencies corresponding to an MICS band.

Referring to FIGS. 1 to 3, an inverse Fourier transform unit 123 may generate first to twentieth subcarriers SC1 to SC20 ranging from 0.9 MHz to 3.0 MHz. A transmission unit 126 may convert the first to twentieth subcarriers SC1 to SC20 to first to twentieth subcarriers SC1 to SC20 ranging from 402 MHz to 405 MHz.

An MISC band (402 MHz to 405 MHz) may be formed of first to tenth frequency channels CH1 to CH10. Each of the first to tenth frequency channels CH1 to CH10 may include at least one sub frequency band. Subcarriers illustrated by a dotted line may be null subcarriers. A fifth subcarrier SC5 may be a null subcarrier.

In FIG. 3, it is assumed that a third frequency channel CH3 corresponds to sub frequency band information FBI. The fifth subcarrier SC5 being a null subcarrier may be generated by sending a null signal to an input point (a fifth input point in FIG. 2), corresponding to sub frequency band information FBI, from among input points (a). That is, in case that a sub frequency band used at the exterior corresponds to the third frequency channel CH3, a data transmitting device 100 may not transmit a radio frequency via the third frequency channel CH3.

If a null signal is sent to a part of the input points (a), null subcarriers may be generated as illustrated by a dotted line.

For example, if a null signal is sent to even-numbered input points of the input points (a), null subcarriers may be generated as illustrated by a dotted line. Main lobes of the subcarriers SC1 to SC20 may not be overlapped one another. In example embodiments, assuming that main lobes of subcarriers are formed over −20 dB, null subcarriers may not have frequency spectrums over −20 dB.

As a result, first to ninth parallel data symbols PDS1 to PDS9 may be transmitted via first and second frequency channels CH1 and CH2 and fourth to tenth frequency channels CH4 to CH10, respectively.

The data transmitting device 100 according to an embodiment of the inventive concept may be configured such that subcarriers corresponding to parallel data symbols PDS1 to PDS9 and null subcarriers are alternately disposed within the first to tenth frequency channels CH1 to CH10. In addition, the data transmitting device 100 may arrange a null subcarrier at a sub frequency band used at the exterior.

The transmission rate of data of the data transmitting device 100 may be improved by sending subcarriers via a plurality of frequency channels. Further, one subcarrier may be transferred via one frequency channel of the MICS band.

FIG. 4 is a diagram illustrating signals input to input points of an inverse Fourier transform unit 123. Referring to FIGS. 2 to 4, a null signal may be received via even-numbered input points of input points (a). In FIG. 4, a logical state of a null signal may be '0'. A null signal may be input via a fifth input point. First to ninth parallel data symbols PDS1 to PDS9 may be received via the remaining input points. If mapped symbols MDS1 to MDS20 are transferred according to a table in FIG. 4, frequency spectrums of subcarriers SC1 to SC20 may be as illustrated in FIG. 3.

Figure 5:
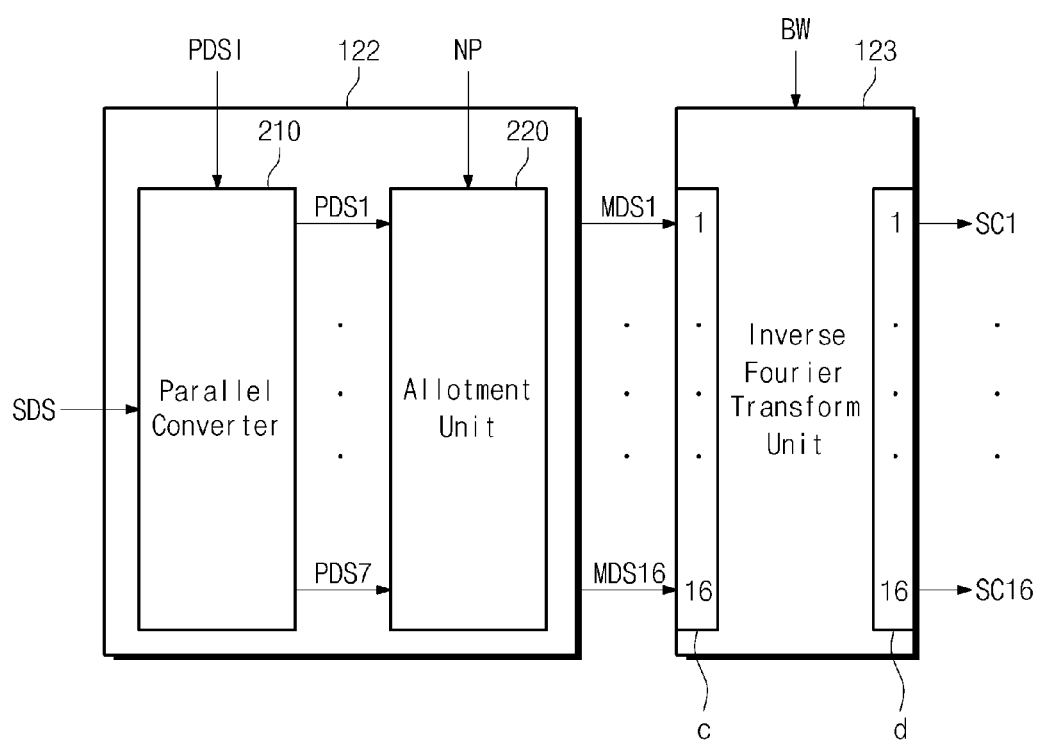
FIG. 5 is a block diagram schematically illustrating an input symbol mapping unit and an inverse Fourier transform unit according to another embodiment of the inventive concept.

FIG. 5 is a block diagram schematically illustrating an input symbol mapping unit and an inverse Fourier transform unit according to another embodiment of the inventive concept. Referring to FIG. 5, a parallel converter 210 may convert serial data symbols SDS to parallel data symbols PDS1 to PDS7 according number information PDSI of parallel data symbols.

In FIG. 5, an allotment portion 122 may generate 16 mapped symbols MDS1 to MDS16. The allotment portion 122 may send a null signal to an input point corresponding to null point information NP. In example embodiments, null point information NP may correspond to at least one input point. The allotment portion 122 may send a null signal to a part of input points (c). The allotment portion 122 may send first to seventh parallel data symbols PDS1 to PDS7 to the remaining of the input points (c).

FIG. 6 is a diagram illustrating signals input via input points of an inverse Fourier transform unit in FIG. 5. Referring to FIGS. 5 and 6, a null signal may be provided to even-numbered input points of input points (c). In addition, an allotment portion 122 may transfer a null signal to an input point (e.g., a fifth input point in FIG. 6) corresponding to null point information NP. The allotment portion 122 may transfer first to seventh parallel data symbols PDS1 to PDS7 to the remaining input points.

Figure 7:
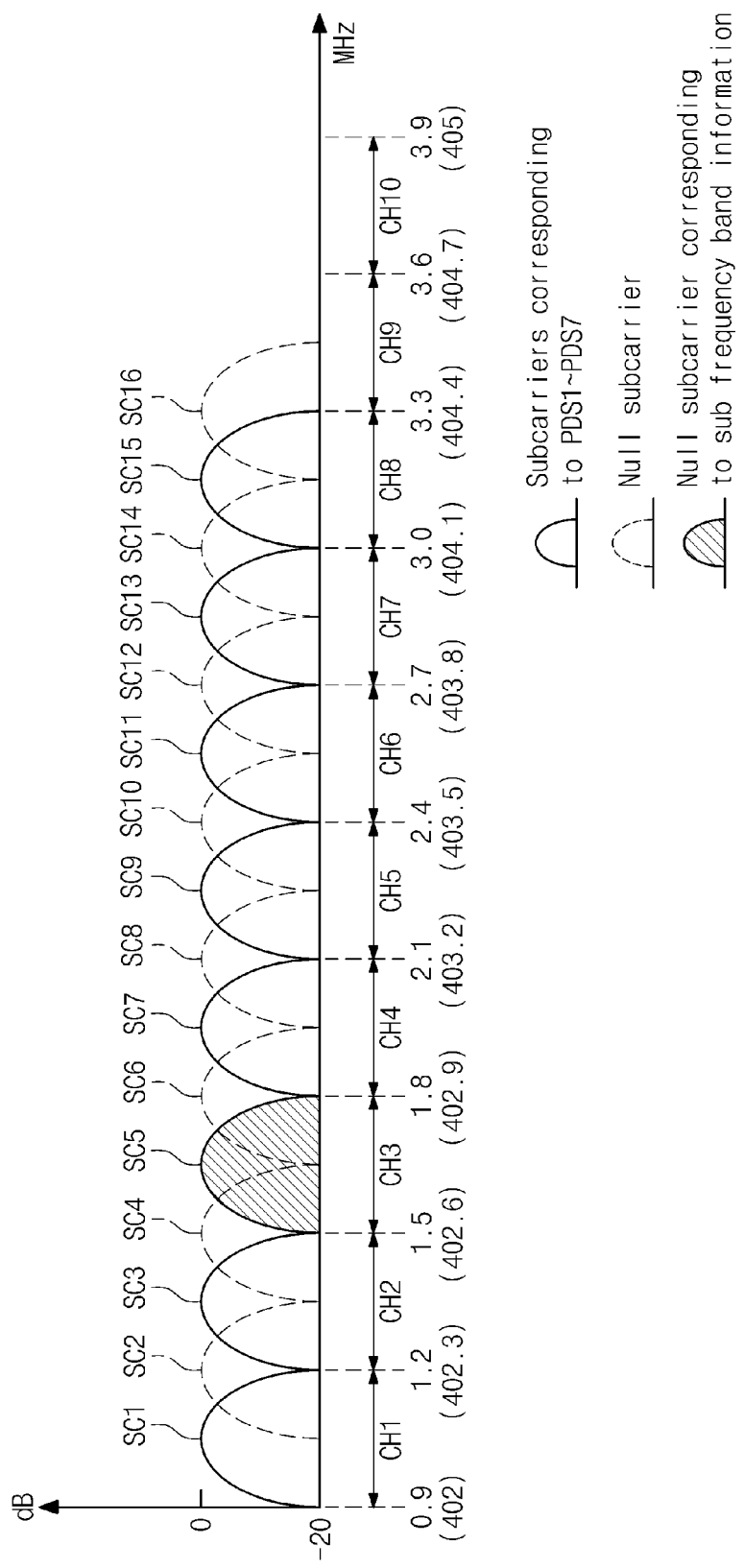
FIG. 7 is a diagram illustrating frequency spectrums of first to sixteen subcarriers SC1 to SC16 when signals allotted according to a table in FIG. 6 are received via input points (c).

FIG. 7 is a diagram illustrating frequency spectrums of first to sixteen subcarriers SC1 to SC16 when signals allotted according to a table in FIG. 6 are received via input points (c). An inverse Fourier transform unit 123 may generate first to sixteen subcarriers SC1 to SC16 between 0.9 MHz and 3.3 MHz. A frequency band of 0.9 MHz to 3.3 MHz may be defined by bandwidth information BW. In a bandwidth of 2.4 MHz, output carriers of the inverse Fourier transform unit 123 having 16 input points may have a bandwidth of 300 KHz.

Referring to FIG. 7, as 7 parallel data symbols PDS1 to PDS7 are received via input points, there may be formed 7 subcarriers each having a main lobe over −20 dB. In other words, a data transmitting device 100 may send data seven frequency channels CH1, CH2, CH4 to CH8 other than a third frequency channel CH3.

FIG. 7 may be exemplary. It is well understood that the data transmitting device 100 can transmit data via fourth to tenth frequency channels CH4 to CH10.

Figure 8:
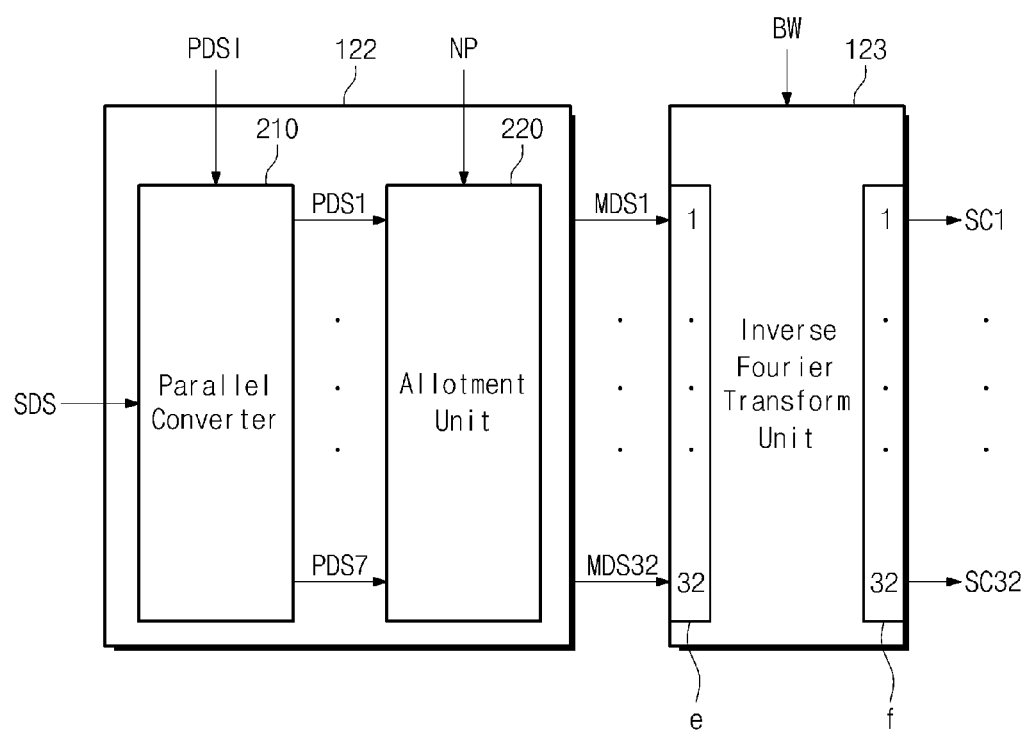
FIG. 8 is a block diagram schematically illustrating an input symbol mapping unit and an inverse Fourier transform unit according to still another embodiment of the inventive concept.

FIG. 8 is a block diagram schematically illustrating an input symbol mapping unit and an inverse Fourier transform unit according to still another embodiment of the inventive concept. In FIG. 8, a parallel converter 210 may generate seven parallel data symbols PDS1 to PDS7 according to number information of parallel data symbols PDSI.

FIG. 9 is a diagram describing signals input via input points of an inverse Fourier transform unit in FIG. 8. Referring to FIGS. 8 and 9, an allotment portion 220 may send a null signal to a part of input points such that main lobes of subcarriers SC1 to SC32 output from an inverse Fourier transform unit 123 are not overlapped. The allotment portion 220 may send a null signal to an input point (e.g., a tenth input point in FIG. 8) corresponding to null point information NP. The allotment portion 220 may send first to seventh parallel data symbols PDS1 to PDS7 to the remaining input points. In FIG. 9, the first to seventh parallel data symbols PDS1 to PDS7 may be provided to input points 2, 6, 14, 18, 22, 26, and 30, respectively.

Figure 10:
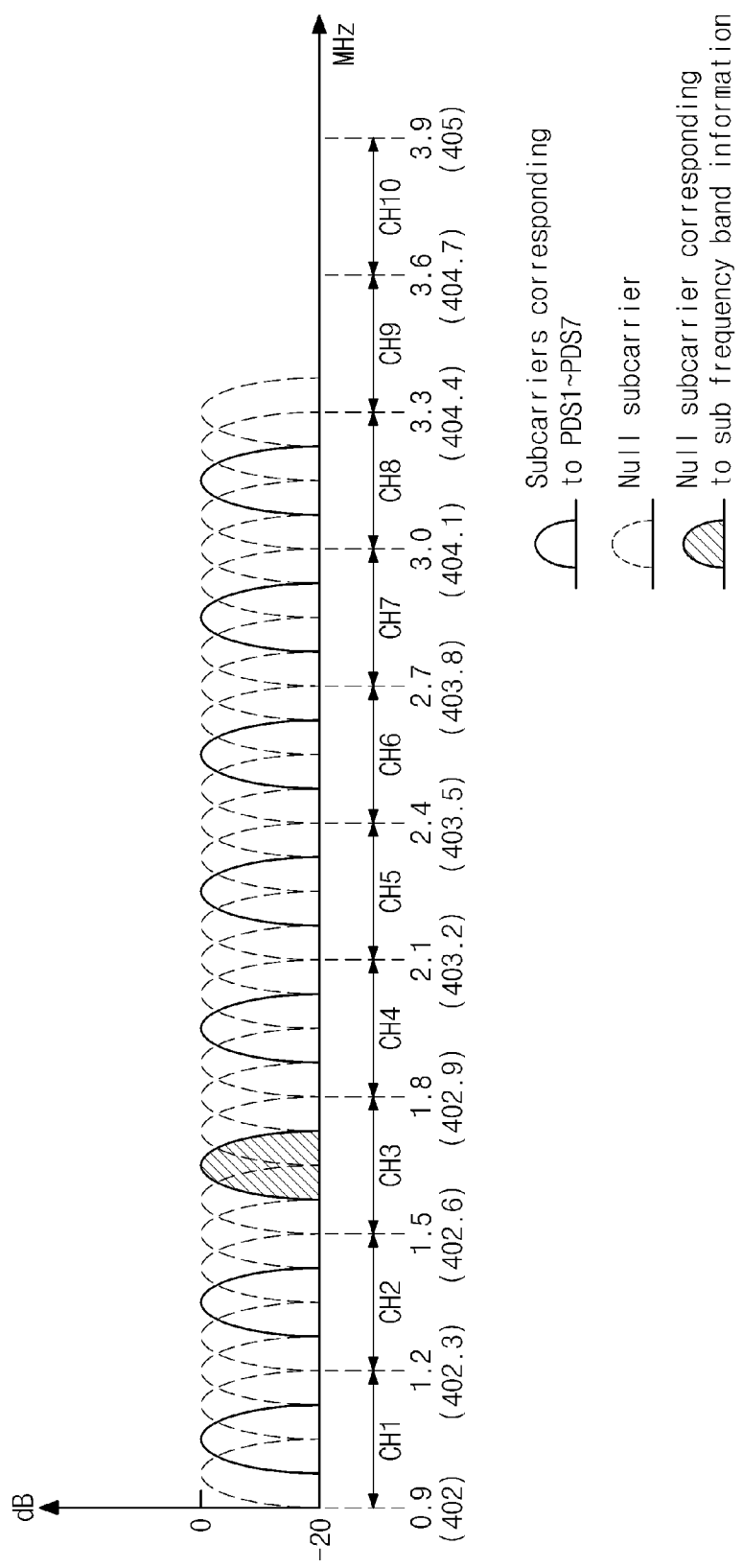
FIG. 10 is a diagram illustrating frequency spectrums of first to thirty-second subcarriers SC1 to SC32 when signals allotted according to a table in FIG. 9 are received via input points (e).

FIG. 10 is a diagram illustrating frequency spectrums of first to thirty-second subcarriers SC1 to SC32 when signals allotted according to a table in FIG. 9 are received via input points (e). In FIG. 10, main lobes sequentially disposed according to an increased in a frequency may be main lobes of first to thirty-second subcarriers SC1 to SC32, respectively.

Referring to FIGS. 8 to 10, an inverse Fourier transform unit 123 may inverse transform signals received via input points (e) to generate first to thirty-second subcarriers SC1 to SC32. The inverse Fourier transform unit 123 may generate the first to thirty-second subcarriers SC1 to SC32 within 0.9 MHz to 3.3 MHz (402 MHz to 404.4 MHz in an MICS band). A frequency band of 0.9 MHz to 3.3 MHz may be defined by bandwidth information BW. In a bandwidth of 2.4 MHz, the first to thirty-second subcarriers SC1 to SC32 may have a bandwidth of 150 KHz, respectively.

As a null signal is received via a tenth input point corresponding to sub frequency band information FBI, a null subcarrier may be placed at a third frequency channel CH3. As a null signal is received via the remaining input points other than input points 2, 6, 14, 18, 22, 26, and 30, null subcarriers may be placed as illustrated by a dotted line. As a result, main lobes of subcarriers may not be overlapped.

Figure 12:
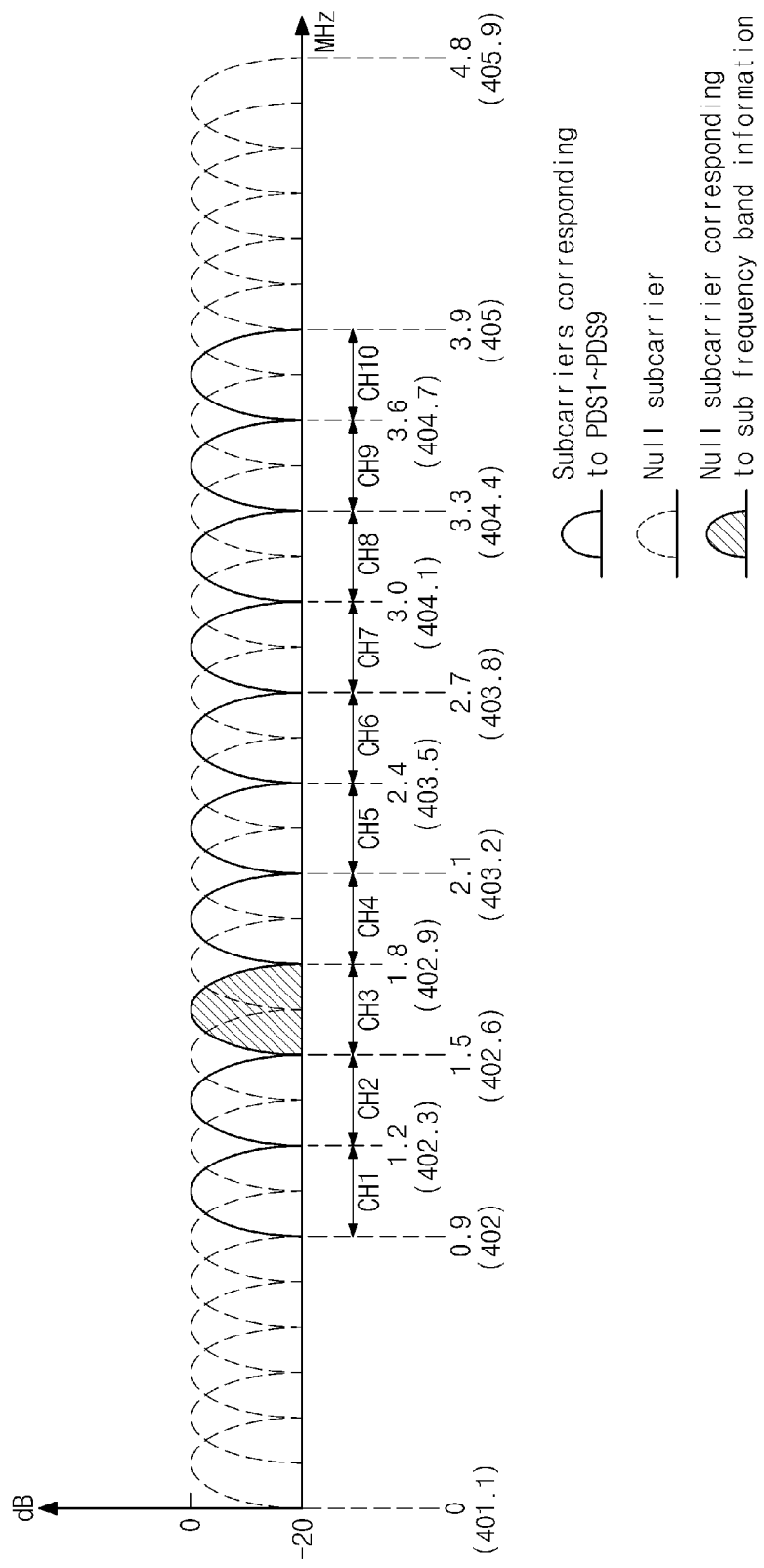
FIG. 12 is a diagram illustrating frequency spectrums of first to thirty-second subcarriers when signals are provided to input points (e) according to a table in FIG. 11.

FIG. 11 is a diagram describing signals input via input points (e) of an inverse Fourier transform unit in FIG. 8. In FIGS. 11 and 12, it is assumed that sub frequency band information FBI corresponds to an eleventh input point. A null signal may be transmitted to the eleventh input point. Null signals may be sent to a part of input points other than the eleventh input point. 9 parallel data symbols PDS1 to PDS9 may be sent to a part of the remaining input points other than the eleventh input point.

FIG. 12 is a diagram illustrating frequency spectrums of first to thirty-second subcarriers when signals are provided to input points (e) according to a table in FIG. 11. In FIG. 12, an inverse Fourier transform unit 123 may generate first to thirty-second subcarriers when signals SC1 to SC32 placed within 0 MHz to 4.8 MHz. A frequency band of 0 MHz to 4.8 MHz may be defined according to bandwidth information BW. In a bandwidth of 4.8 MHz, output subcarriers of the inverse Fourier transform unit 123 having 32 input points may have a bandwidth of 300 KHz, respectively.

Referring to FIGS. 11 and 12, a null signal may be received via input points (e.g., input points 1 to 6 and 27 to 32 in FIG. 11) corresponding to sub frequency bands escaping from first to tenth frequency channels. A null signal may be received via an eleventh input point corresponding to sub frequency band information FBI. A null signal may be received via a part of input points (e.g., 7 to 20) such that main lobes of subcarriers are not overlapped. First to ninth parallel data symbols PDS1 to PDS9 may be sent to the remaining input points. This may enable null subcarriers and the first to ninth parallel data symbols PDS1 to PDS9 to be placed at a frequency band illustrated in FIG. 12.

Figure 13:
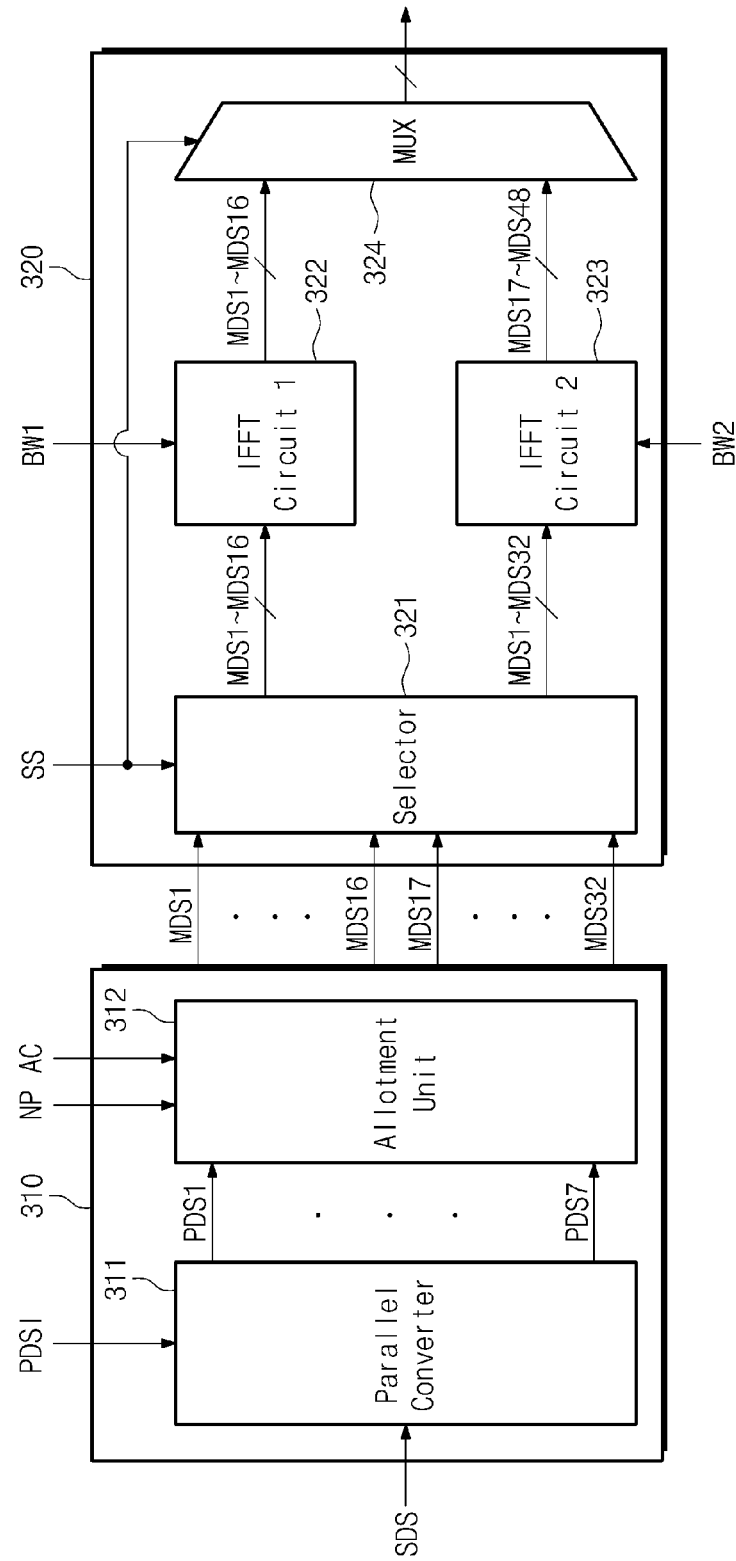
FIG. 13 is a block diagram schematically illustrating an input symbol mapping unit and an inverse Fourier transform unit according to still another embodiment of the inventive concept.

FIG. 13 is a block diagram schematically illustrating an input symbol mapping unit and an inverse Fourier transform unit according to still another embodiment of the inventive concept. Referring to FIG. 13, an input symbol mapping unit 310 may include a parallel converter 311 and an allotment portion 312. The parallel converter 311 may convert serial data symbols SDS to first to seventh parallel data symbols PDS1 to PDS7 according to number information of parallel data symbols PDSI received from a control unit 125.

The allotment portion 312 may receive an allotment control signal AC from the control unit 125. The allotment portion 312 may generate mapped symbols MDS1 to MDS32 according to the allotment control signal AC.

In example embodiments, referring to FIG. 14, in case that the allotment control signal AC has a logical value of '00', the allotment portion 312 may generate mapped symbols MDS1 to MDS16 according to a table in FIG. 6. At this time, mapping symbols MDS17 to MDS32 may be a null signal. If the allotment control signal AC has a logical value of '01', the allotment portion 312 may generate mapped symbols MDS1 to MDS32 according to a table in FIG. 9. If the allotment control signal AC has a logical value of '10', the allotment portion 312 may generate mapped symbols MDS1 to MDS32 according to a table in FIG. 11.

Further, the allotment portion 312 may provide a null signal to an input point corresponding to null point information NP.

Returning to FIG. 13, an inverse Fourier transform unit 320 may include a selector 321, first and second inverse Fourier transform circuits 322 and 323, and a multiplexer 324. The selector 321 may receive mapped symbols MDS1 to MDS32. The selector 321 may receive a selection signal SS from the control unit 125.

In response to the selection signal SS, the selector 321 may send mapped symbols MDS1 to MDS16 to the first inverse Fourier transform circuit 322 or mapped symbols MDS1 to MDS32 to the second inverse Fourier transform circuit 323. In example embodiments, if the selection signal SS has a logical state of '0', the selector 321 may send the mapped symbols MDS1 to MDS16 to the first inverse Fourier transform circuit 322. When the selection signal SS has a logical state of '1', the selector 321 may send mapped symbols MDS1 to MDS32 to the second inverse Fourier transform circuit 323.

Referring to FIG. 14, when the allotment control signal AC has a logical state of '00', the selection signal SS may have a logical state of '0'. When the allotment control signal AC has logical states of '01' and '10', the selection signal SS may have a logical state of '1'.

Returning to FIG. 13, the first and second inverse Fourier transform circuits 322 and 323 may perform inverse Fourier transform based on first and second bandwidth information BW1 and BW2. The first inverse Fourier transform circuit 322 may perform inverse Fourier transform on the mapped symbols MDS1 to MDS16 to generate subcarriers SC1 to SC16. The second inverse Fourier transform circuit 323 may perform inverse Fourier transform on the mapped symbols MDS1 to MDS32 to generate subcarriers SC17 to SC48.

Returning to FIG. 14, the control unit 125 may provide the first bandwidth information BW1 directing 0.9 MHz to 3.3 MHz when the allotment control signal AC of '00' is generated. Frequency spectrums of the subcarriers SC1 to SC16 may be as illustrated in FIG. 7. At this time, null point information NP may correspond to a fifth mapped symbol MDS5. The fifth mapped symbol MDS5 may be a null signal. The fifth mapped symbol MDS5 may be a null subcarrier.

The control unit 125 may provide the second bandwidth information BW2 directing 0.9 MHz to 3.3 MHz when the allotment control signal AC of '01' is generated. Frequency spectrums of the subcarriers SC17 to SC48 may be as illustrated in FIG. 10. At this time, subcarriers SC17 to SC48 may correspond to subcarriers SC1 to SC32 in FIGS. 9 and 10.

The control unit 125 may provide the second bandwidth information BW2 directing 0.9 MHz to 3.3 MHz when the allotment control signal AC of '10' is generated. Frequency spectrums of the subcarriers SC17 to SC48 may be as illustrated in FIG. 12. At this time, subcarriers SC17 to SC48 may correspond to subcarriers SC1 to SC32 in FIGS. 11 and 12.

Returning to FIG. 13, a multiplexer 324 may receive the subcarriers SC1 to SC16 and the subcarriers SC17 and SC48. The multiplexer 324 may send the subcarriers SC1 to SC16 or the subcarriers SC17 and SC48 to a side lobe removing unit 124 (refer to FIG. 1) in response to a selection signal SS.

With the above description, frequency spectrums in FIGS. 7, 10, and 12 may be provided selectively.

Figure 15:
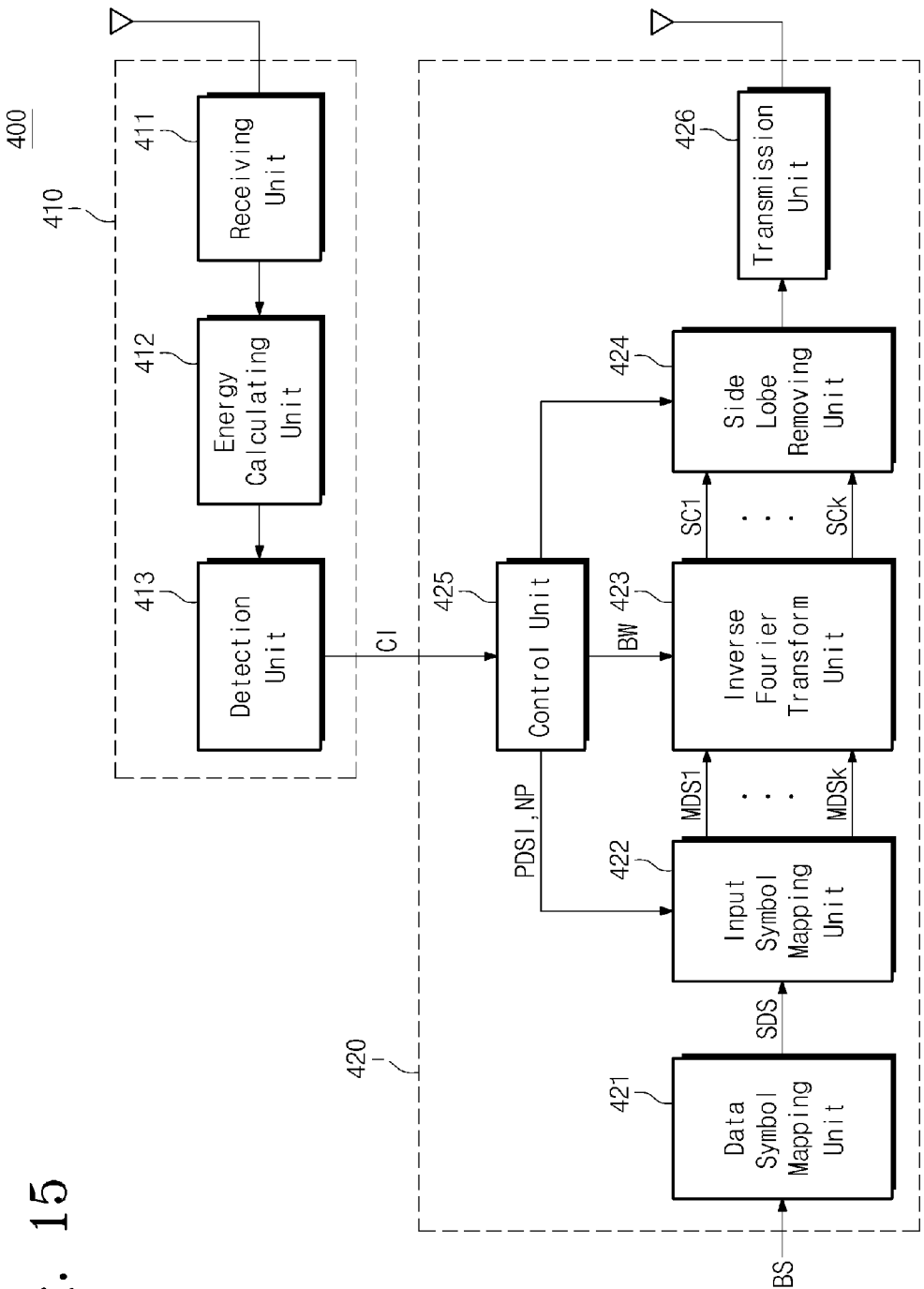
FIG. 15 is a block diagram schematically illustrating a data transmitting device according to another embodiment of the inventive concept.

FIG. 15 is a block diagram schematically illustrating a data transmitting device according to another embodiment of the inventive concept. Referring to FIG. 15, a data transmitting device 400 may include a detection block 410 and a data transmitting block 420.

The detection block 410 may receive a radio frequency signal to detect frequency channels of an MICS band including the received radio frequency signal. The detection block 410 may send detected frequency channel information CI to a control unit 425.

A receiving unit 411 may receive a radio frequency signal from the exterior. An energy calculating unit 412 may receive a radio frequency signal from the receiving unit 411 to calculate an energy value of each frequency channel. A detection unit 413 may detect frequency channels used at the exterior using the calculated energy values.

The data transmitting block 420 may include a data symbol mapping unit 421, an input symbol mapping unit 422, an inverse Fourier transform unit 423, a side lobe removing unit 424, a control unit 425, and a transmission unit 426. Constituent elements 421, 422, 423, 424, and 426 of the data transmitting block 420 may be the same as illustrated in FIG. 1, and description thereof is thus omitted.

The control unit 425 may receive frequency channel information CI from the detection block 410. The control unit 425 may provide number information of parallel data symbols PDSI based on frequency channel information CI. A maximum value of number information of parallel data symbols PDSI may be the number of frequency channels, included in a bandwidth indicated by bandwidth information BW, excepting a frequency channel corresponding to frequency channel information CI.

The control unit 425 may provide null point information NP. The null point information may be generated based on the frequency channel information CI. In example embodiments, the control unit 425 may calculate sub frequency bands corresponding to input points based on a bandwidth value of the bandwidth information BW and the number of input points of the inverse Fourier transform unit 123. The control unit 425 may detect sub frequency bands, corresponding to the frequency channel information CI, from among the calculated sub frequency bands. The control unit 425 may provide null point information NP. In response to the null point information NP, the input symbol mapping unit 422 may provide a null signal to an input point corresponding to the frequency channel information CI.

In example embodiments, a data transmitting device according to an embodiment of the inventive concept may be applied to a wireless communication that is used at medical apparatuses. For example, the data transmitting device according to an embodiment of the inventive concept may be applied to a wireless communication of a medical apparatus that uses an MICS band. However, the inventive concept is not limited thereto.

A data transmitting device 100 according to an embodiment of the inventive concept may convert parallel data symbols according to the OFDM manner. The data transmitting device 100 may convert parallel data symbols together with null signals such that main lobes of subcarriers are not overlapped. The transmission rate of data of the data transmitting device 100 may be improved.

Further, subcarriers may be converted using sub frequency bands that are separated from one another. Thus, the data transmitting device 100 may be applied to the MISC protocol.

Figure 16:
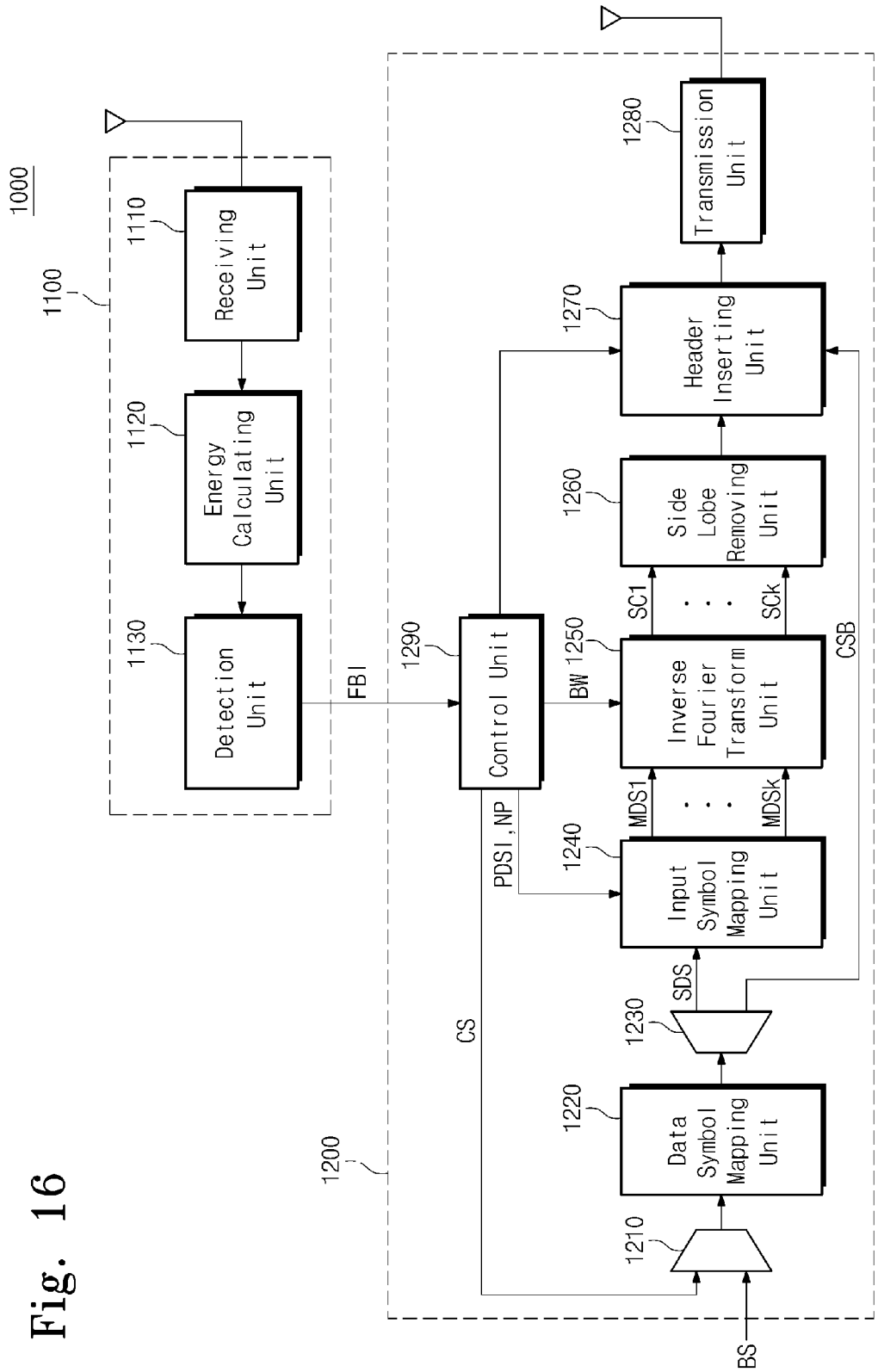
FIG. 16 is a block diagram schematically illustrating a data transmitting device according to still another embodiment of the inventive concept.

FIG. 16 is a block diagram schematically illustrating a data transmitting device according to still another embodiment of the inventive concept. Referring to FIG. 16, a data transmitting device 1000 may include a detection block 1100 and a data transmitting block 1200.

The detection block 1100 may detect a frequency band occupied at the outside. The detection block 1100 may include a receiving unit 1110, an energy calculating unit 1120, and a detection unit 1130. The receiving unit 1110 may receive a radio frequency (RF) signal from the outside. The receiving unit 1110 may select a predetermined frequency band (e.g., the whole of an MICS band) of received RF signals. An RF signal in the selected band may be sent to the energy calculating unit 1120.

In example embodiments, the receiving unit 1110 may include one of low pass filters, high pass filters, band pass filters, or a combination of at least two thereof.

The energy calculating unit 1120 may receive an RF signal from the receiving unit 1110. The energy calculating unit 1120 may calculate an energy value of each of a plurality of sub frequency bands. One sub frequency band may mean a frequency domain where one subcarrier (e.g., one of SC1 to SC16) is placed.

In example embodiments, an energy value of a sub frequency band including an RF signal may be larger than that of a sub frequency band not including an RF signal. For example, the energy calculating unit 1120 may calculate an energy value of each sub frequency band by calculating an absolute value (or, a square of absolute value) of an amplitude of an RF signal within each sub frequency band.

The detection unit 1130 may detect a sub frequency band used at the outside using an energy value calculated by the energy calculating unit 1120. In example embodiments, the detection unit 1130 may detect a sub frequency band, having an energy value larger than a threshold value, from among energy values of sub frequency bands. Information on the detected sub frequency band FBI (hereinafter, referred to as sub frequency band information) may be sent to the control unit 1290.

In other example embodiments, frequency channel information corresponding to the detected sub frequency band can be provided to the control unit 1290. At this time, a frequency channel indicated by frequency channel information may mean at least one of MICS frequency channels.

The data transmitting block 1200 may convert data symbols into subcarriers according to the OFDM (Orthogonal Frequency Division Multiplexing) manner, and may transfer the subcarriers to the outside.

The data transmitting block 1200 may include a multiplexer 1210, a data symbol mapping unit 1220, a de-multiplexer 1230, an input symbol mapping 1240, an inverse Fourier transform unit 1250, a side lobe removing unit 1260, a header inserting unit 1270, a transmission unit 1280, and a control unit 1290.

The multiplexer 1210 may receive serial bit streams BS from the exterior. For example, the serial bit streams BS may include image data, voice data, text data, or the like. The multiplexer 1210 may receive a control stream CS from the control unit 1290. The multiplexer 1210 may provide either the serial bit streams BS or the control stream CS to the data symbol mapping unit 1220 according to the control of the control unit 1290.

The data symbol mapping unit 1220 may convert the serial bit streams BS from the multiplexer 1210 into serial data symbols SDS. In example embodiments, the data symbol mapping unit 1220 may generate the serial data symbols SDS by performing QPSK (Quadrature Phase Shift Keying), QAM (Quadrature Amplitude Modulation) or combinations thereof. For example, the data symbol mapping unit 1220 may generate the serial data symbols SDS by making digital data constituting the serial bit streams BS correspond to four phases. For example, the data symbol mapping unit 1220 may generate the serial data symbols SDS according to both ASK (Amplitude Shift Keying) and PSK (Phase Shift Keying). The serial data symbols SDS may be sent to the input symbol mapping unit 1240 via the de-multiplexer 1230.

The data symbol mapping unit 1220 may convert the control stream CS from the multiplexer 1210 to a control symbol CSB. The control stream CS may include frequency channel information indicating a frequency channel through which a data subcarrier is to be transmitted. The data subcarrier may mean subcarriers obtained by converting parallel data symbols. Information associated with a frequency channel to be used to transmit data subcarriers may be decided based on the sub frequency band information FBI.

The data symbol mapping unit 1220 may convert the control stream using a predetermined manner. For example, the control stream CS may be converted to the control symbol CSB according to the QPSK. The control symbol CSB may be directly transmitted to the header inserting unit 1270 via the de-multiplexer 1230 without OFDM conversion.

The de-multiplexer 1230 may output an output of the data symbol mapping unit 1220 to one of the input symbol mapping unit 1240 and the header inserting unit 1270 according to the control of the control unit 1290.

The input symbol mapping unit 1240 may operate responsive to the control of the control unit 1290. The input symbol mapping unit 1240 may receive the serial data symbols SDS to generate mapped symbols MDS1 to MDSk, which are transferred to input points (referring to a in FIG. 17) of the inverse Fourier transform unit 1250.

The input symbol mapping unit 1240 may convert the serial data symbols SDS into parallel data symbols. The input symbol mapping unit 1240 may provide the parallel data symbols and null signals to the inverse Fourier transform unit 1260 as mapped symbols MDS1 to MDSk. For example, null signals and parallel data symbols may be mapped in turn, respectively.

The inverse Fourier transform unit 1250 may perform inverse Fourier transformation according to the control of the control unit 1290. The inverse Fourier transform unit 1250 may receive bandwidth information BW from the control unit 1290. Inverse Fourier transformation may be made within a bandwidth corresponding to the bandwidth information BW. The inverse Fourier transform unit 1250 may transform the mapped symbols MDS1 to MDSk into the subcarriers SC1 to SCk according to the OFDM manner, respectively. The mapped symbols MDS1 MDSk may be transformed using sub frequency bands that are overlapped one another. The subcarriers SC1 to SCk may be orthogonal to one another. In example embodiments, the subcarriers SC1 to SCk output from the inverse Fourier transform unit 1250 may be signals within a baseband.

The subcarriers SC1 to SCk may constitute one OFDM symbol. In example embodiments, the inverse Fourier transform unit 1250 may perform inverse Fourier transform according to the IFFT (Inverse Fast Fourier Transform) algorithm.

The side lobe removing unit 1260 may operate according to the control of the control unit 1290. The side lobe removing unit 1260 may convert the parallel subcarriers SC1 to SCk into serial subcarriers. The serial subcarriers may constitute one OFDM symbol. The side lobe removing unit 1260 may remove a side lobe of subcarriers included in the OFDM symbol. For example, a side lobe may mean the amplitude excepting a main lobe of each subcarrier. For example, the side lobe may mean the amplitude of a subcarrier that escapes from a sub frequency band including each subcarrier.

In example embodiments, the side lobe removing unit 1260 may remove a side lobe by performing Guard Interval (GI) addition and windowing. For example, the side lobe removing unit 1260 may add a prefix and a suffix as the guard interval to each of serial OFDM symbols that are continuous. The side lobe removing unit 1260 may reduce an absolute value of the amplitude of each OFDM symbol by multiplying a windowing function with OFDM symbols to which the prefix and suffix are added. As an absolute value of the amplitude of each OFDM symbol is reduced, absolute values of subcarriers included in OFDM symbols may be reduced. As a result, side lobes of subcarriers included in OFDM symbols may be removed.

The header inserting unit 1270 may add header information to serial OFDM symbols. In example embodiments, head information may include a preamble, information associated with a manner used to convert bit streams BS, bandwidth information BW, information associated with a data length of OFDM symbols, and the like. A data receiving device communicating with the data transmitting device 1000 may convert OFDM symbols to bit streams based on the header information.

The header inserting unit 1270 may add header information to a control symbol CSB from the de-multiplexer 1230. Header information added at transmission of the control symbol CSB may include a preamble and information associated with a length of the control symbol CSB.

The transmission unit 1280 may convert OFDM symbols, to which header information is added, or the control symbol CSB, to which header information is added, into signals of a high frequency band (e.g., a frequency of the MICS band), and may transfer the converted signals to the exterior. For example, the transmission unit 1280 may increase a frequency of a serial OFDM symbol by 401.1 MHz.

Figure 17:
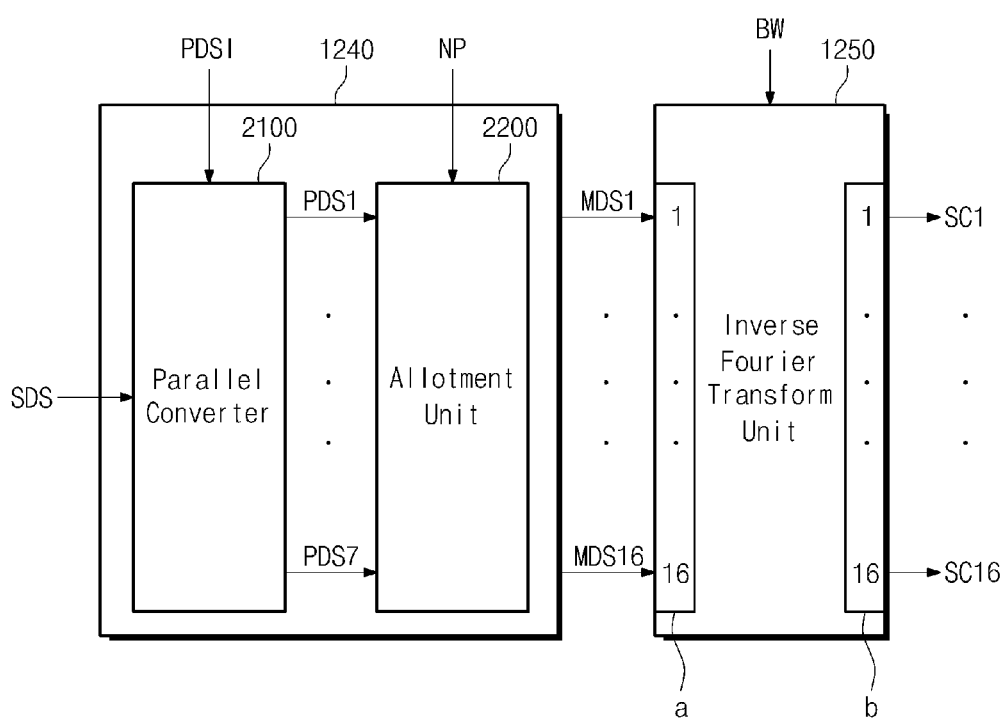
FIG. 17 is a block diagram schematically illustrating an input symbol mapping unit and an inverse Fourier transformation unit in FIG. 16.

FIG. 17 is a block diagram schematically illustrating an input symbol mapping unit and an inverse Fourier transformation unit in FIG. 16. Referring to FIGS. 16 and 17, an input symbol mapping unit 1240 may include a parallel converter 2100 and an allotment portion 2200. The parallel converter 2100 may receive number information of parallel data symbols PDSI from a control unit 1290.

The parallel converter 2100 may convert serial data symbols SDS to parallel data symbols PDS1 to PDS7 according to number information of parallel data symbols PDSI. At this time, the parallel converter 2100 may classify continuously received serial data symbols SDS into a plurality of groups to convert each group to parallel data symbols PDS1 to PDS7. In FIG. 17, a number value indicated by number information PDI of parallel data symbols may be 7.

A maxim value indicated by number information PDSI may be the number of frequency channels (e.g., frequency channels included in a bandwidth from among an MISC band) of a bandwidth indicated by the bandwidth information BW other than frequency channels used at the exterior. For example, it is assumed that bandwidth information BW indicates 0.9 MHz to 3.3 MHz (402 MHz to 404.4 MHz in the MISC band). In case that a sub frequency band used at the exterior corresponds to a third frequency channel CH3 (i.e., one channel is detected), a maximum value of the number information PDSI of parallel data symbols may be 7. The number information of parallel data symbols PDSI may be calculated and provided by the control unit 1290.

The allotment portion 2200 may receive first to seventh parallel data symbols PDS1 to PDS7. The allotment portion 2200 may receive null point information NP from the control unit 1290. The allotment portion 2200 may transmit a null signal to an input point corresponding to null point information NP from among the input points (a). The allotment portion 2200 may provide a null signal to a part of input points other than an input point corresponding to null point information NP. The allotment portion 2200 may provide the parallel data symbols PDS1 to PDS7 to a part of the remaining input points other than an input point corresponding to null point information NP. For example, the allotment portion 2200 may provide a null signal and a parallel data symbol to each input point in turn. Null signals and the parallel data symbols PDS1 to PDS7 transmitted from the allotment portion 2200 may constitute mapped symbols MDS1 to MDS16.

Null point information NP may be provided based on sub frequency band information FBI. Null point information NP may be information indicating a specific input point. In example embodiments, sub frequency bands corresponding to the input points (a) may be calculated using a bandwidth value of bandwidth information BW and the number of input points. The control unit 1290 may judge an input point corresponding to sub frequency band information FBI based on sub frequency bands corresponding to the input points (a). The control unit 1290 may provide the allotment portion 2200 with null point information NP being information on a detected input point.

An inverse Fourier transform unit 1250 may have 16 input points (a) and 16 output points (b). The input points (a) may correspond to sub frequency bands, respectively. The inverse Fourier transform unit 1250 may perform inverse Fourier transform on each mapped symbol on the basis of a sub frequency band corresponding to each input point. The inverse Fourier transform unit 1250 may generate subcarriers SC1 to SC16 via the output points (b).

In communication apparatuses to which the MICS protocol is to be applied, an interval between data subcarriers (e.g., an interval between center frequencies of subcarriers used to transmit data) may maintain 300 KHz, and subcarriers may not be overlapped. A lobe, escaping from a frequency channel, from among lobes of subcarriers transmitted via one frequency channel may be maintained below −20 dB compared with a peak value.

With an embodiment of the inventive concept, subcarriers obtained by converting data symbols may be placed at sub frequency bands, which are separated from one another, by making inverse Fourier transform on data symbols and null signals according to the OFDM manner. The amplitude of a subcarrier (hereinafter, referred to as null subcarrier) due to inverse transformation of null signals may be very small. Thus, main lobes of subcarriers SC1 to SC16 may not be overlapped due to the orthogonal property of the subcarriers SC1 to SC6. Subcarriers obtained by converting data symbols may be placed at sub frequency bands, which are separated from one another. For example, separated sub frequency bands may correspond to MICS frequency channels, respectively.

Figure 19:
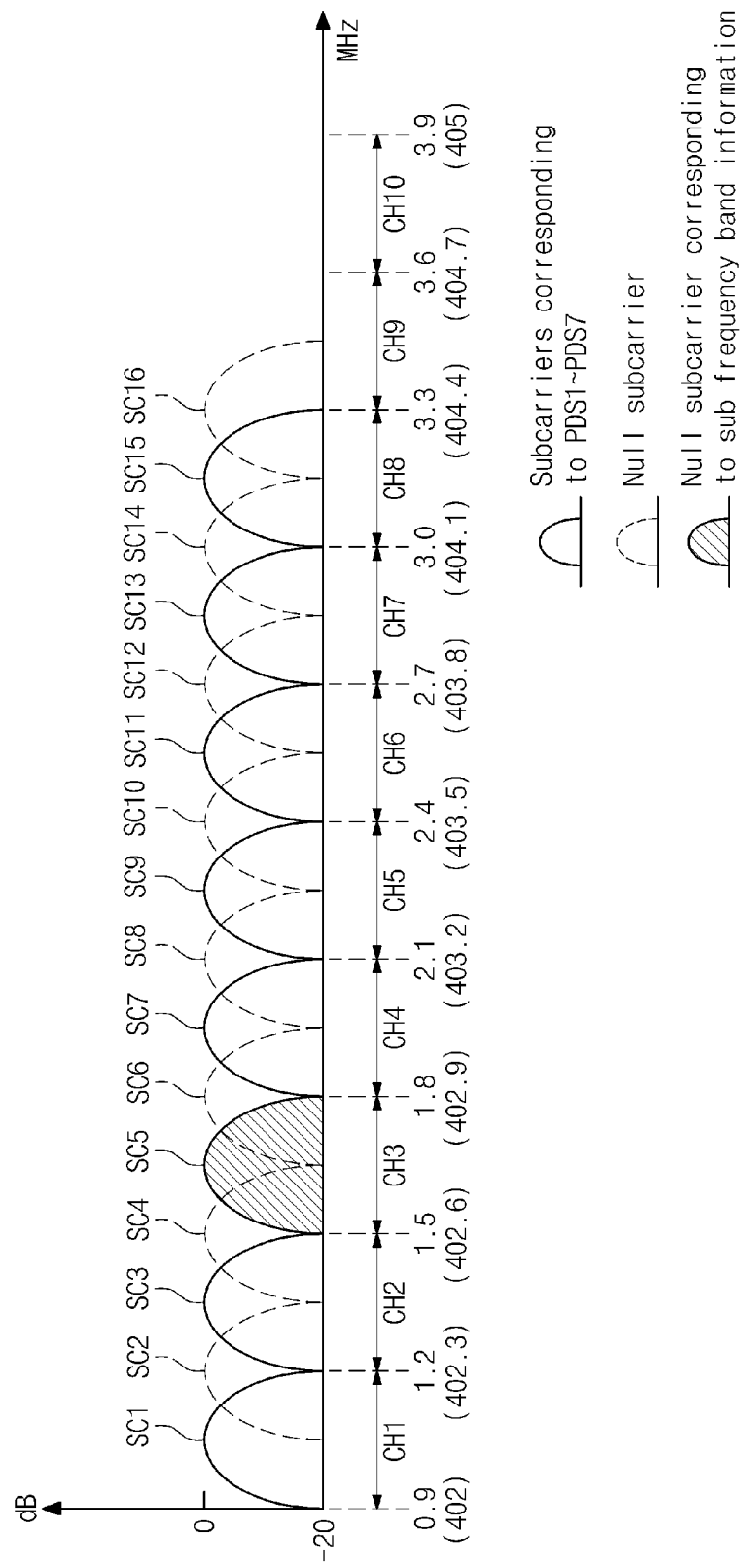
FIG. 19 is a diagram describing frequency spectrums of subcarriers.

FIG. 18 is a diagram illustrating signals input via input points of an inverse Fourier transform unit. FIG. 19 is a diagram describing frequency spectrums of subcarriers. In FIG. 18, values in brackets may indicate frequency values corresponding to an MICS band. In FIGS. 18 and 19, it is assumed that a fifth input point corresponds to sub frequency band information FBI.

Referring to FIGS. 18 and 19, a null signal may be input via even-numbered input points of input points (a). In FIG. 19, a null signal may be illustrated to have a logical state of '0'. A null signal may be received via the fifth input point. Parallel data symbols PDS1 to PDS7 may be received via the remaining input points.

An inverse Fourier transform unit 1230 may generate subcarriers SC1 to SC16 ranging from 0.9 MHz to 3.0 MHz. A transmission unit 1260 may convert the subcarriers SC1 to SC16 to subcarriers SC1 to SC16 ranging from 402 MHz to 405 MHz.

An MISC band (402 MHz to 405 MHz) may be formed of first to tenth frequency channels CH1 to CH10. Each of the first to tenth frequency channels CH1 to CH10 may include at least one sub frequency band. Subcarriers illustrated by a dotted line may be null subcarriers. Subcarriers illustrated by a solid line may be subcarriers (i.e., data subcarriers) corresponding to first to seventh parallel data symbols. A fifth subcarrier SC5 may be a null subcarrier.

The fifth subcarrier SC5 being a null subcarrier may be generated by sending a null signal to an input point (i.e., a fifth input point), corresponding to sub frequency band information FBI, from among input points (a). That is, in case that a sub frequency band used at the exterior corresponds to a third frequency channel CH3, a data transmitting device according to an embodiment of the inventive concept may not transmit a radio frequency via the third frequency channel CH3.

Null subcarriers may be generated as illustrated by a dotted line, by sending a null signal to a part of input points excepting the fifth input point. For example, if a null signal is sent to even-numbered input points of the input points (a), null subcarriers may be generated as illustrated by a dotted line. Main lobes of the subcarriers SC1 to SC20 may not be overlapped one another. In example embodiments, assuming that main lobes of subcarriers are formed over −20 dB, null subcarriers may not have frequency spectrums over −20 dB. That is, data subcarriers SC1, SC3, SC7, SC9, SC11, SC13, and SC15 may be placed at an independent sub frequency band. In other words, data subcarriers SC1, SC3, SC7, SC9, SC11, SC13, and SC15 may be placed within an MICS frequency channel.

The first to seventh parallel data symbols PDS1 to PDS7 may be sent to a part of the remaining input points excepting the fifth input point. Subcarriers corresponding to the first to seventh parallel data symbols PDS1 to PDS7 may be transmitted via first and second frequency channels CH1 and CH2 and fourth to eighth frequency channels CH4 to CH8, respectively.

With an embodiment of the inventive concept, the transmission rate of data of the data transmitting device may be improved by sending subcarriers corresponding to data symbols via a plurality of frequency channels. Further, one subcarrier corresponding to one data symbol may be transferred via one frequency channel of the MICS band.

Figure 20:
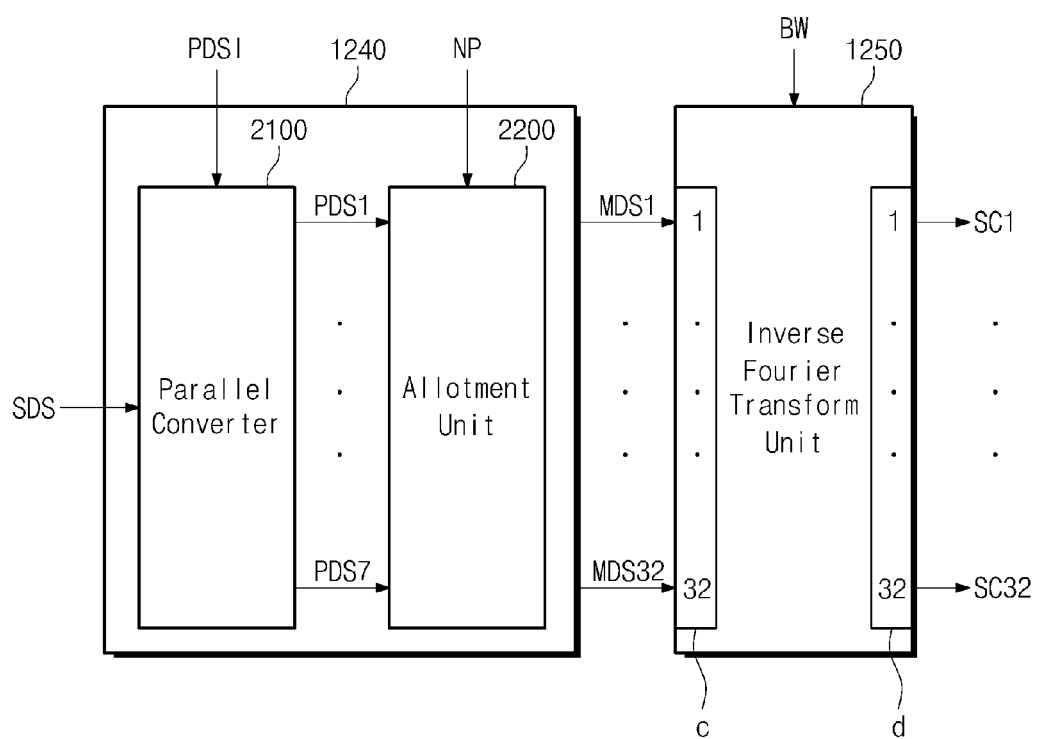
FIG. 20 is a block diagram schematically illustrating an input symbol mapping unit and an inverse Fourier transform unit according to another embodiment of the inventive concept.

FIG. 20 is a block diagram schematically illustrating an input symbol mapping unit and an inverse Fourier transform unit according to another embodiment of the inventive concept. Referring to FIG. 20, a parallel converter 2100 may generate parallel data symbols PDS1 to PDS7 according number information PDSI of parallel data symbols. In FIG. 20, an allotment portion 1220 may generate 32 mapped symbols MDS1 to MDS32. An inverse Fourier transform unit 1250 may include 32 input points (c).

The allotment portion 1220 may send a null signal to an input point corresponding to null point information NP. In example embodiments, null point information NP may correspond to at least one input point. The allotment portion 1220 may send a null signal to a part of input points (c). The allotment portion 1220 may send first to seventh parallel data symbols PDS1 to PDS7 to a part of the remaining input points (c).

FIG. 21 is a diagram illustrating signals input via input points of an inverse Fourier transform unit in FIG. 20. Referring to FIGS. 20 and 21, an allotment portion 2200 may send a null signal to a part of input points such that main lobes of subcarriers SC1 to SC32 output from an inverse Fourier transform unit 1250 are not overlapped. The allotment portion 2200 may send a null signal to an input point (e.g., a tenth input point) corresponding to null point information NP. The allotment portion 2200 may send first to seventh parallel data symbols PDS1 to PDS7 to the remaining input points. In FIG. 21, the first to seventh parallel data symbols PDS1 to PDS7 may be input to input points 2, 6, 14, 18, 22, 26, and 30.

Figure 22:
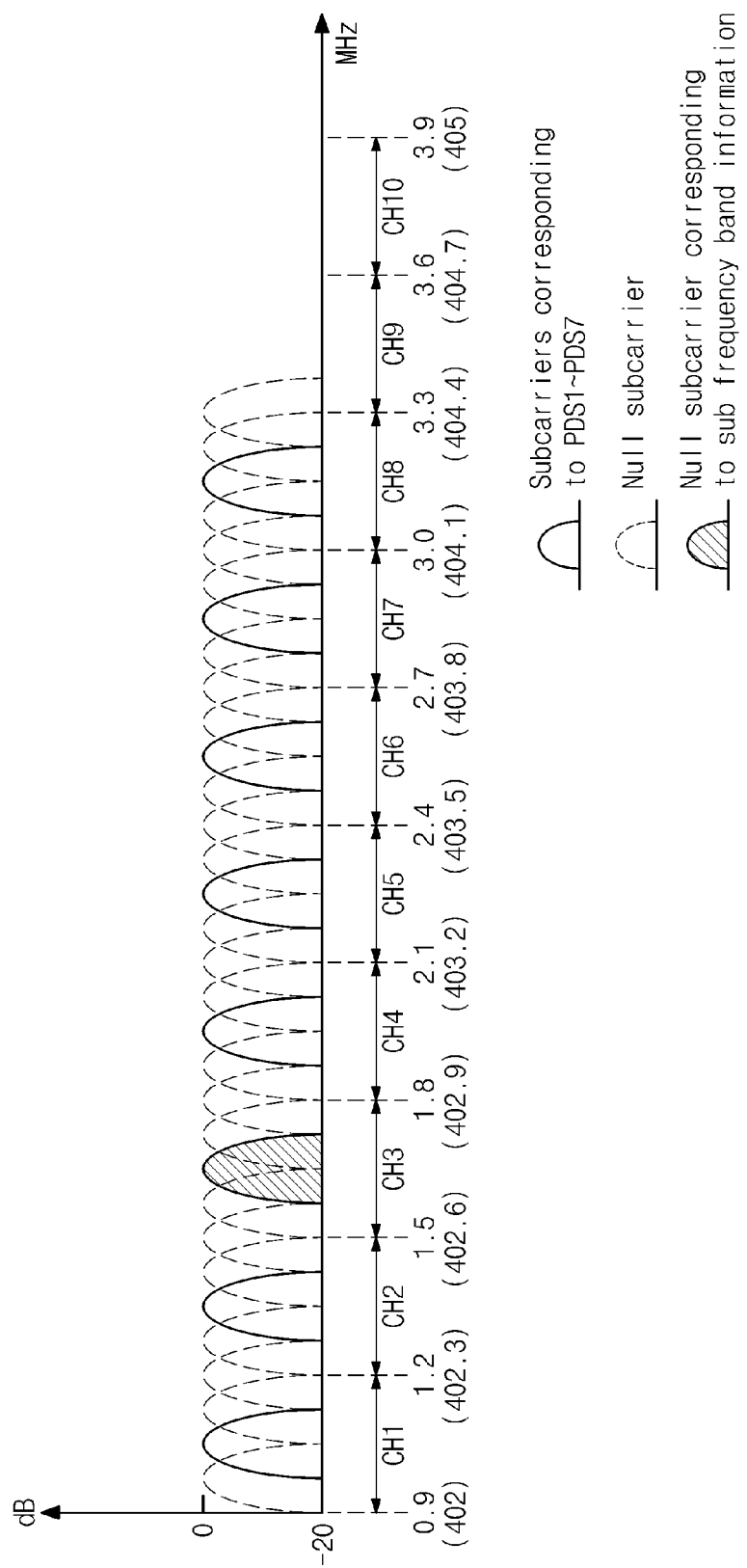
FIG. 22 is a diagram illustrating frequency spectrums of subcarriers when signals allotted according to a table in FIG. 21 are received via input points (c).

FIG. 22 is a diagram illustrating frequency spectrums of subcarriers when signals allotted according to a table in FIG. 21 are received via input points (c). In FIG. 22, main lobes of subcarriers SC1 to SC32 may be illustrated sequentially according to an increase in a frequency.

Referring to FIGS. 20 to 22, an inverse Fourier transform unit 1250 may convert signals received via input points (c) to generate subcarriers SC1 to SC32. The inverse Fourier transform unit 1250 may generate the subcarriers SC1 to SC32 between 0.9 MHz and 3.3 MHz (402 MHz to 404.4 MHz in an MICS band). A frequency band of 0.9 MHz to 3.3 MHz may be defined by bandwidth information BW. In a bandwidth of 2.4 MHz, the first to thirty-second subcarriers may have a bandwidth of 150 KHz, respectively.

As a null signal is input via a tenth input point corresponding to sub frequency band information FBI, a null subcarrier may be placed at a third frequency channel CH3. As a null signal is input via the remaining input points other than input points 2, 6, 14, 18, 22, 26, and 30, null subcarriers may be placed as illustrated by a dotted line. Thus, main lobes of subcarriers may not be overlapped.

Figure 24:
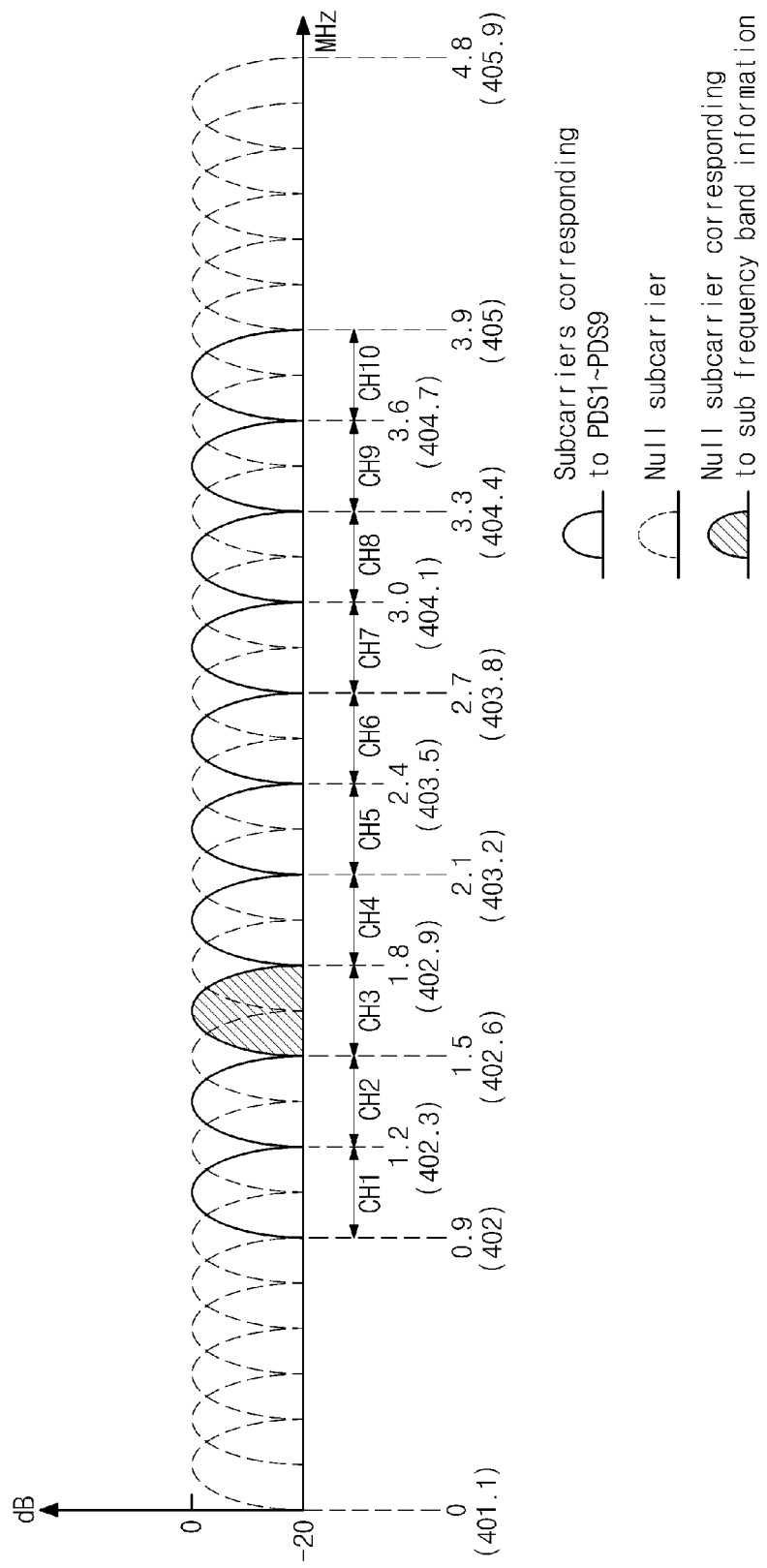
FIG. 24 is a diagram illustrating frequency spectrums of first to thirty-second subcarriers when signals are provided to input points (c) according to a table in FIG. 8.

FIG. 23 is a diagram describing signals input via input points of an inverse Fourier transform unit in FIG. 20 according to another embodiment of the inventive concept. In FIGS. 23 and 24, it is assumed that sub frequency band information FBI corresponds to an eleventh input point. A null signal may be transmitted to the eleventh input point. Null signals may be sent to a part of input points other than the eleventh input point. 9 parallel data symbols PDS1 to PDS9 may be sent to a part of the remaining input points other than the eleventh input point.

FIG. 24 is a diagram illustrating frequency spectrums of first to thirty-second subcarriers when signals are provided to input points (c) according to a table in FIG. 8. In FIG. 24, an inverse Fourier transform unit 1250 may generate first to thirty-second subcarriers when signals SC1 to SC32 placed within 0 MHz to 4.8 MHz. A frequency band of 0 MHz to 4.8 MHz may be defined according to bandwidth information BW. In a bandwidth of 4.8 MHz, output subcarriers of the inverse Fourier transform unit 1250 having 32 input points may have a bandwidth of 300 KHz, respectively.

Referring to FIGS. 23 and 24, a null signal may be received via input points (e.g., input points 1 to 6 and 27 to 32 in FIG. 23) corresponding to sub frequency bands escaping from first to tenth frequency channels. A null signal may be received via an eleventh input point corresponding to sub frequency band information FBI. A null signal may be received via a part of input points (e.g., 7 to 20) such that main lobes of subcarriers are not overlapped. First to ninth parallel data symbols PDS1 to PDS9 may be sent to the remaining input points. This may enable null subcarriers and the first to ninth parallel data symbols PDS1 to PDS9 to be placed at a frequency band of 0 MHz to 4.8 MHz.

Figure 25:
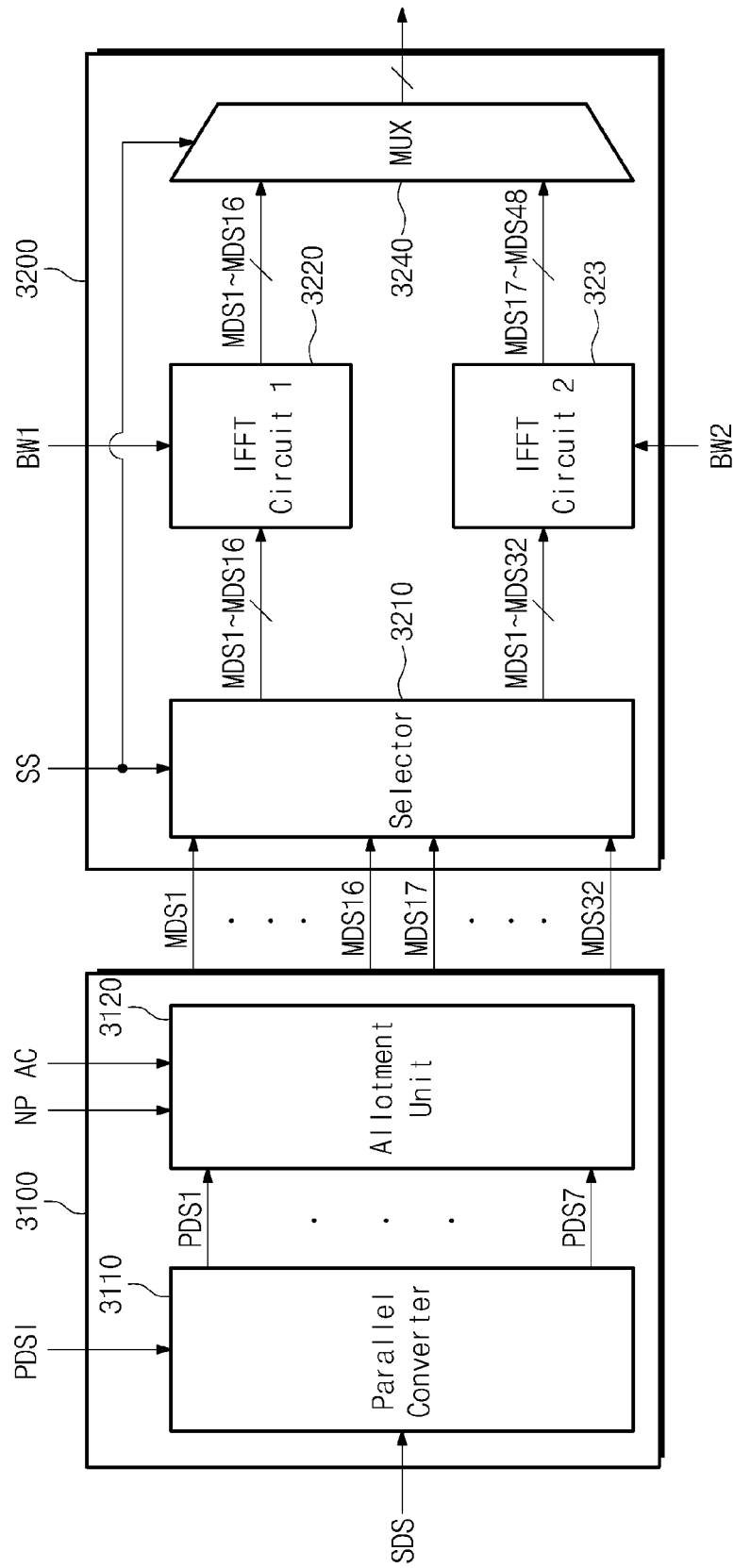
FIG. 25 is a block diagram schematically illustrating an input symbol mapping unit and an inverse Fourier transform unit according to still another embodiment of the inventive concept.

FIG. 25 is a block diagram schematically illustrating an input symbol mapping unit and an inverse Fourier transform unit according to still another embodiment of the inventive concept. Referring to FIG. 25, an input symbol mapping unit 3100 may include a parallel converter 3110 and an allotment portion 3120. The parallel converter 3110 may convert serial data symbols SDS to first to seventh parallel data symbols PDS1 to PDS7 according to number information PDSI of parallel data symbols received from a control unit 1290.

The allotment portion 3120 may receive an allotment control signal AC from the control unit 1290. The allotment portion 3120 may generate mapped symbols MDS1 to MDS32 according to the allotment control signal AC.

In example embodiments, referring to FIG. 26, in case that the allotment control signal AC has a logical value of '00', the allotment portion 3120 may generate mapped symbols MDS1 to MDS16 according to a table in FIG. 18. At this time, mapping symbols MDS17 to MDS32 may be a null signal. If the allotment control signal AC has a logical value of '01', the allotment portion 3120 may generate mapped symbols MDS1 to MDS32 according to a table in FIG. 21. If the allotment control signal AC has a logical value of '10', the allotment portion 3120 may generate mapped symbols MDS1 to MDS32 according to a table in FIG. 23.

Further, the allotment portion 3120 may provide a null signal to an input point corresponding to null point information NP.

Returning to FIG. 25, an inverse Fourier transform unit 3200 may include a selector 3210, first and second inverse Fourier transform circuits 3220 and 3230, and a multiplexer 3240. The selector 3210 may receive mapped symbols MDS1 to MDS32. The selector 3210 may receive a selection signal SS from the control unit 1290.

In response to the selection signal SS, the selector 3210 may send mapped symbols MDS1 to MDS16 to the first inverse Fourier transform circuit 3220 or mapped symbols MDS1 to MDS32 to the second inverse Fourier transform circuit 3230. In example embodiments, if the selection signal SS has a logical state of '0', the selector 3210 may send the mapped symbols MDS1 to MDS16 to the first inverse Fourier transform circuit 3220. When the selection signal SS has a logical state of '1', the selector 3210 may send mapped symbols MDS1 to MDS32 to the second inverse Fourier transform circuit 3230.

Referring to FIG. 26, when the allotment control signal AC has a logical state of '00', the selection signal SS may have a logical state of '0'. When the allotment control signal AC has logical states of '01' and '10', the selection signal SS may have a logical state of '1'.

Returning to FIG. 25, the first and second inverse Fourier transform circuits 3220 and 3230 may perform inverse Fourier transform based on first and second bandwidth information BW1 and BW2. The first inverse Fourier transform circuit 3220 may perform inverse Fourier transform on the mapped symbols MDS1 to MDS16 to generate subcarriers SC1 to SC16. The second inverse Fourier transform circuit 3230 may perform inverse Fourier transform on the mapped symbols MDS1 to MDS32 to generate subcarriers SC17 to SC48.

Returning to FIG. 26, the control unit 1290 may provide the first bandwidth information BW1 directing 0.9 MHz to 3.3 MHz when the allotment control signal AC of '00' is generated. Frequency spectrums of the subcarriers SC1 to SC16 may be as illustrated in FIG. 19. At this time, null point information NP may correspond to a fifth mapped symbol MDS5. The fifth mapped symbol MDS5 may be a null signal. The fifth mapped symbol MDS5 may be a null subcarrier.

The control unit 1290 may provide the second bandwidth information BW2 directing 0.9 MHz to 3.3 MHz when the allotment control signal AC of '01' is generated. Frequency spectrums of the subcarriers SC17 to SC48 may be as illustrated in FIG. 25. At this time, subcarriers SC17 to SC48 may correspond to subcarriers SC1 to SC32 in FIGS. 21 and 22.

The control unit 1290 may provide the second bandwidth information BW2 directing 0.9 MHz to 3.3 MHz when the allotment control signal AC of '10' is generated. Frequency spectrums of the subcarriers SC17 to SC48 may be as illustrated in FIG. 24. At this time, subcarriers SC17 to SC48 may correspond to subcarriers SC1 to SC32 in FIGS. 23 and 24.

Returning to FIG. 25, a multiplexer 3240 may receive the subcarriers SC1 to SC16 and the subcarriers SC17 and SC48. The multiplexer 3240 may send the subcarriers SC1 to SC16 or the subcarriers SC17 and SC48 to a side lobe removing unit 1260 (refer to FIG. 16) in response to a selection signal SS.

With the above description, frequency spectrums in FIGS. 19, 22, and 24 may be provided selectively.

Figure 27:
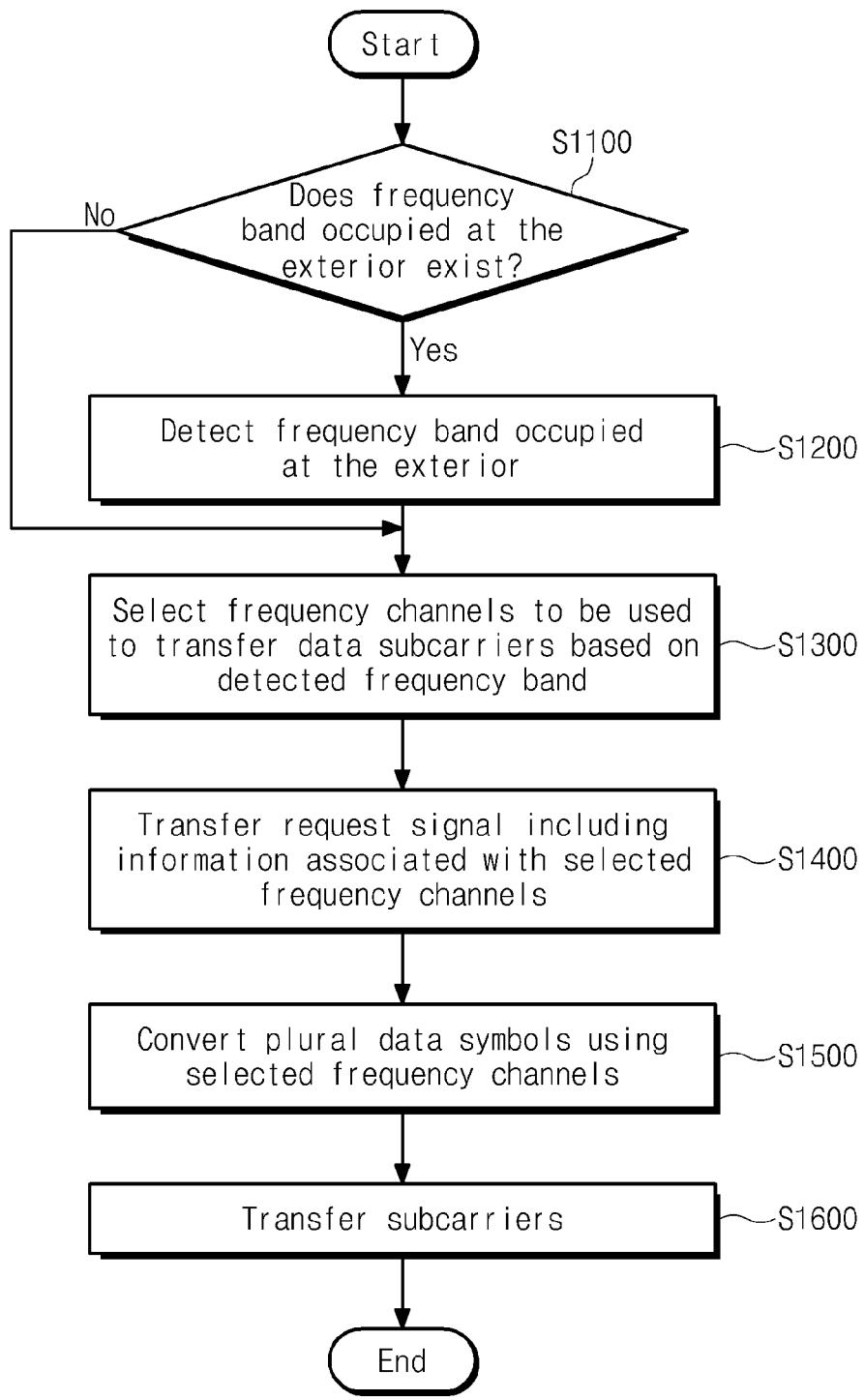
FIG. 27 is a flowchart describing a data transmitting method according to an embodiment of the inventive concept.

FIG. 27 is a flowchart describing a data transmitting method according to an embodiment of the inventive concept. Referring to FIGS. 16 and 27, in operation S1100, whether a frequency band occupied at the exterior exists may be judged. If a frequency band occupied at the exterior exists, the method proceeds to operation S1200, in which an occupied frequency band is detected. Whether a frequency band occupied at the exterior exists may be detected by a detection block 1100.

In operation S1300, frequency channels to be used to transmit data subcarriers may be selected according to the detected frequency band. A control unit 1290 may select the remaining frequency channels included in the whole bandwidth (i.e., a bandwidth indicated by bandwidth information) to be inversely transformed, other than the frequency channel used at the exterior.

Figure 29:
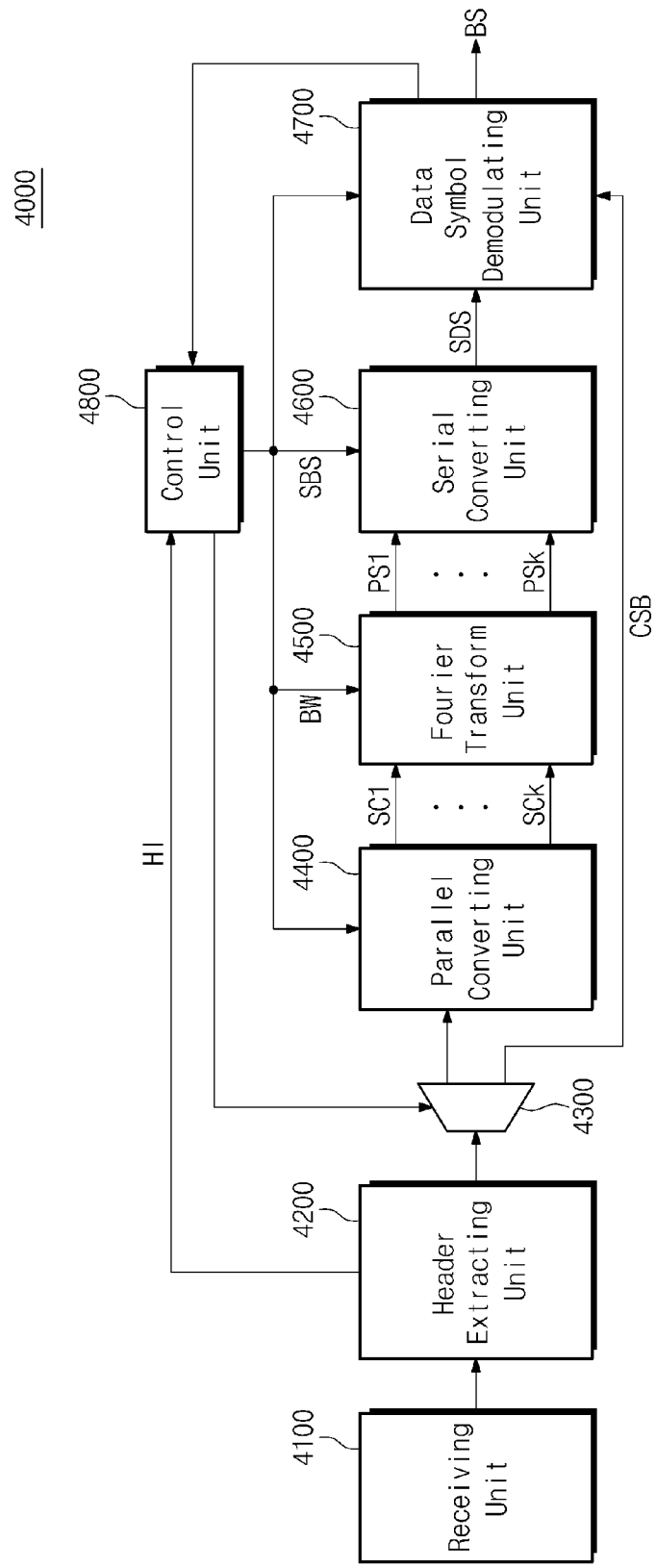
FIG. 29 is a block diagram schematically illustrating a data receiving device according to an embodiment of the inventive concept.

In operation S1400, a request signal including information associated with the selected frequency channels may be sent to a data receiving device (refer to FIG. 29). The control unit

1290 may generate a control stream CS including information associated with the selected frequency channels. The control stream CS may be converted to a control symbol CSB. The control symbol CSB may constitute the request signal together with header information.

The request signal may be transmitted via a predetermined frequency channel. The request signal may be transmitted via one of MICS frequency channels. For example, the request signal may be sent via a tenth frequency channel CH10. The data receiving device may judge a signal transmitted via the tenth frequency channel CH10 as the request signal, and may convert the request signal to a baseband signal. The data receiving device may judge frequency channels to be used to transfer data subcarriers, according to information on the selected frequency channels included in the request signal.

In operation S1500, data symbols and null signals may be converted according to the OFDM manner such that data symbols are converted using the selected frequency channels. Inverse Fourier transform on a null signal may be made on the basis of a sub frequency band corresponding to a frequency channel occupied at the exterior. Inverse Fourier transform on data symbols may be made on the basis of a sub frequency band corresponding to a frequency channel occupied at the exterior. A plurality of subcarriers may be generated by performing inverse Fourier transform on parallel data symbols and null signals according to the OFDM manner. Subcarriers of a baseband may be converted to a high frequency band by a transmission unit 1280. As a result, data subcarriers may be placed at selected frequency channels, respectively.

In operation S1600, the converted subcarriers may be sent to the data receiving device. The subcarriers converted in operation S1500 may be converted to OFDM symbols, and the OFDM symbols may be sent to the data receiving device.

Figure 28:
FIG. 28 is a diagram describing data formats of a main signal and a request signal.
Figure 28:

FIG. 28 is a diagram describing data formats of a main signal and a request signal. Referring to FIG. 28, a request signal RS may include first header information HI1 and control information CI. The request signal RS may include information on selected frequency channels. The first header information HI1 may be provided to a header inserting unit 1270. In example embodiments, the first header information HI1 included in the request signal RS may include a preamble and information associated with a data length of the control information CI. The control information CI may be understood to mean data transferred by a control symbol CSB. The control information CI may include information on selected frequency channels.

A main signal MS may include second header information HI2 and user data UD. The second header information HI2 may be provided to the header inserting unit 1270. In example embodiments, the second header information HI2 included in the main signal MS may include a preamble, information associated with a manner used to modulate bit streams BS, bandwidth information BW, and information associated with a data length of user data UD. The user data UD may be understood to mean data transferred by OFDM symbols.

FIG. 29 is a block diagram schematically illustrating a data receiving device according to an embodiment of the inventive concept. Referring to FIG. 29, a data receiving device 4000 may include a receiving unit 4100, a header extracting unit 4200, a de-multiplexer 4300, a parallel conversion unit 4400, a Fourier transform unit 4500, a serial conversion unit 4600, a data symbol demodulating unit 4700, and a control unit 4800.

The receiving unit 4100 may receive a request signal RS and a main signal MS from a data transmitting device 1000 (refer to FIG. 15). The receiving unit 4100 may convert the request signal RS transmitted via a high frequency band to a request signal RS of a baseband. The receiving unit 4100 may convert the main signal MS transmitted via a high frequency band to a main signal MS of a baseband.

The header extracting unit 4200 may extract header information HI (refer to FIG. 28) included in the request signal RS, and may provide the header information HI to the control unit 4800. The header extracting unit 4200 may extract header information HI (refer to FIG. 28) included in the main signal MS, and may provide the header information HI to the control unit 4800. The control unit 4800 may control the elements 4500, 4600, and 4700 in response to the provided header information HI.

When the request signal RS is received, the de-multiplexer 4300 may receive a control symbol CSB. When the main signal MS is received, the de-multiplexer 4300 may receive OFDM symbols.

The de-multiplexer 4300 may transfer an output of the header extracting unit 4200 to the parallel conversion unit 4400 or the data symbol demodulating unit 4700 according to the control of the control unit 4800. The control symbol CSB may be sent to the data symbol demodulating unit 4700. The OFDM symbols may be sent to the parallel conversion unit 4400.

The parallel conversion unit 4400 may convert each OFDM symbol received from the de-multiplexer 4300 to subcarriers SC1 to SCk according to the control of the control unit 4800. At this time, parallel subcarriers SC1 to SCk may be formed of null subcarriers and data subcarriers. For example, the control unit 4800 may control the parallel conversion unit 4400 so as to generate k subcarriers SC1 to SCk, according to OFDM symbol length information included in the header information HI.

The Fourier transform unit 4500 may convert the parallel subcarriers SC1 to SCk to generate parallel symbols PS1 to PSk. The Fourier transform unit 4500 may perform Fourier transform based on bandwidth information BW from the control unit 4800. The bandwidth information BW may be included in the header information HI. Fourier transform may be made within a bandwidth corresponding to the bandwidth information BW. For example, a sub frequency band corresponding to each input point may be decided according to a bandwidth indicated by the bandwidth information BW and the number of input points of the Fourier transform unit 4500.

The serial conversion unit 4600 may select data symbols of the parallel symbols PS1 to PSkk, and may generate serial data symbols SDS using the selected data symbols.

The serial conversion unit 4600 may receive a symbol selection signal SBS from the control unit 4800. The serial conversion unit 4600 may decide symbols corresponding to the symbol selection signal SBS of the parallel symbols PS1 to PSk as data symbols.

The symbol selection signal SBS may be generated based on information on selected frequency channels included in the control stream CS. The control unit 4800 may decide a sub frequency band corresponding to each input point (or, each output point), according to the whole bandwidth (i.e., a bandwidth indicated by bandwidth information) to be inversely transformed and the number of input points of the Fourier transform unit 4500. The control unit 4800 may judge output points outputting data symbols according to information on selected frequency channels. The control unit 4800 may generate the symbol selection signal SBS according to a judgment result. That is, the control unit 4800 may control the serial conversion unit 4600 so as to select symbols provided via the judged output points.

The data symbol demodulating unit 4700 may demodulate serial data symbols SDS to generate serial bit streams BS. The control unit 4800 may judge a manner of a data transmitting device 1000 (refer to FIG. 16) used to modulate serial data symbols SDS, based on the header information HI from the header extracting unit 4200. The control unit 4800 may control the data symbol demodulating unit 4700 so as to demodulate serial data symbols SDS to serial bit streams BS in the same manner as the judged manner.

The data symbol demodulating unit 4700 may demodulate a control symbol CSB from the de-multiplexer 4300 to generate the control stream CS. In the data transmitting device 1000, the control symbol CSB may be modulated according to a predetermined modulation manner. The data symbol demodulating unit 4700 may demodulate the control symbol CSB to the control stream CS in the same manner as the predetermined manner.

Figure 30:
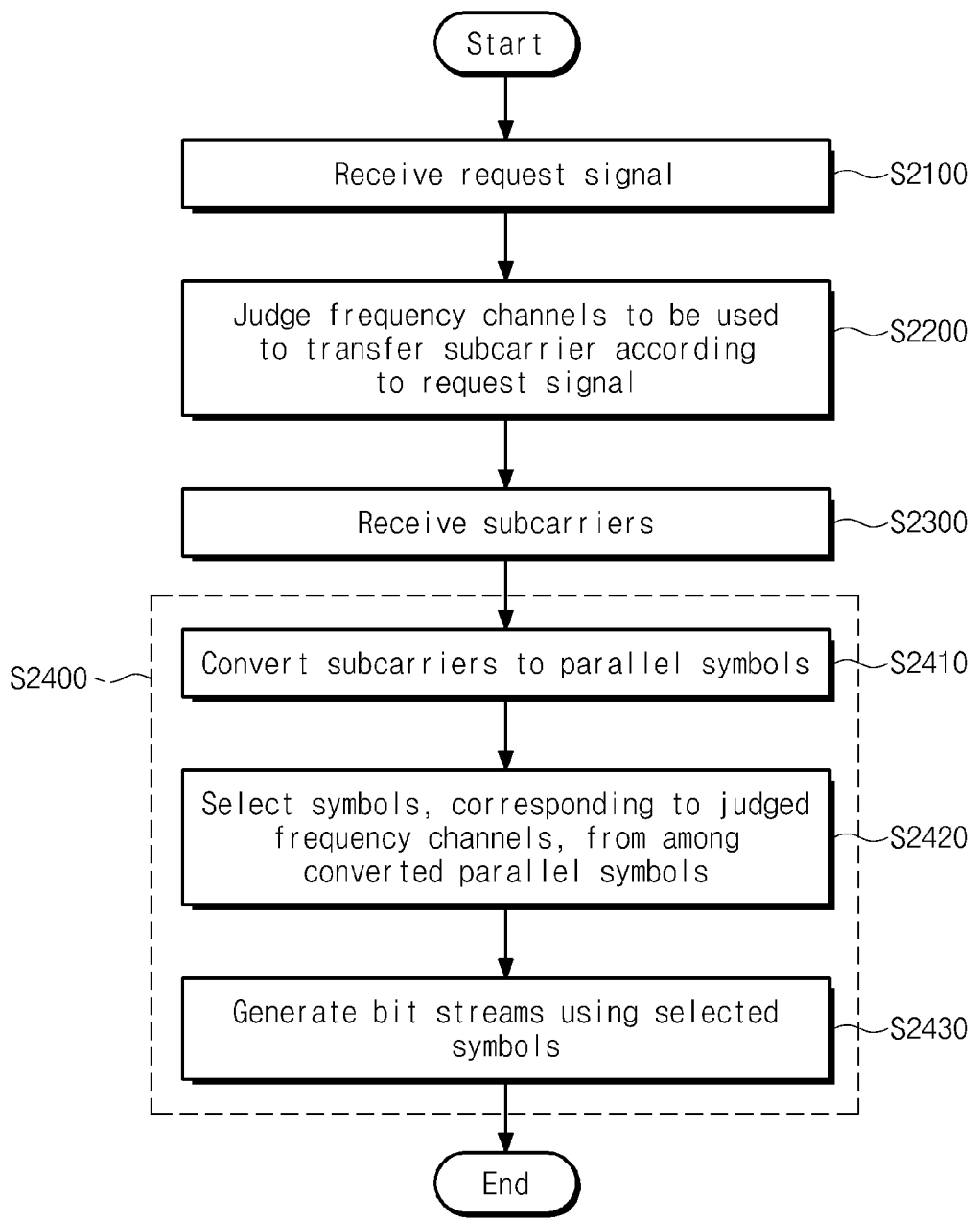
FIG. 30 is a flowchart describing a data receiving method according to an embodiment of the inventive concept.

FIG. 30 is a flowchart describing a data receiving method according to an embodiment of the inventive concept. Referring to FIGS. 29 and 30, in operation S2100, a request signal may be received. The request signal may be received via a predetermined frequency channel of MICS frequency channels.

In operation S2200, frequency channels to be used to transfer a data subcarrier may be judged according to the request signal. A data receiving device 4000 may detect a signal received via the predetermined frequency channel as the request signal. The data receiving device 4000 may convert the request signal to a request signal of a baseband. The data receiving device 4000 may judge frequency channels to be used to transfer data subcarriers according to information on selected frequency channels included in the request signal.

In operation S2300, the data receiving device 4000 may receive subcarriers. In operation S2400, a plurality of bit streams may be generated based on subcarriers transferred via the judged frequency channels. The operation S2400 may include operations S2410, S2420, and S2430.

In operation S2410, received subcarriers may be converted to parallel symbols PS1 to PSk. There may be selected symbols corresponding to the judged frequency channel from among the converted parallel symbols. The selected symbols may be data symbols. In operation S2430, bit streams may be generated by demodulating the selected symbols.

In accordance with an embodiment of the inventive concept, there may be provided a method of receiving data subcarriers received via a plurality of frequency channels.

Figure 31:
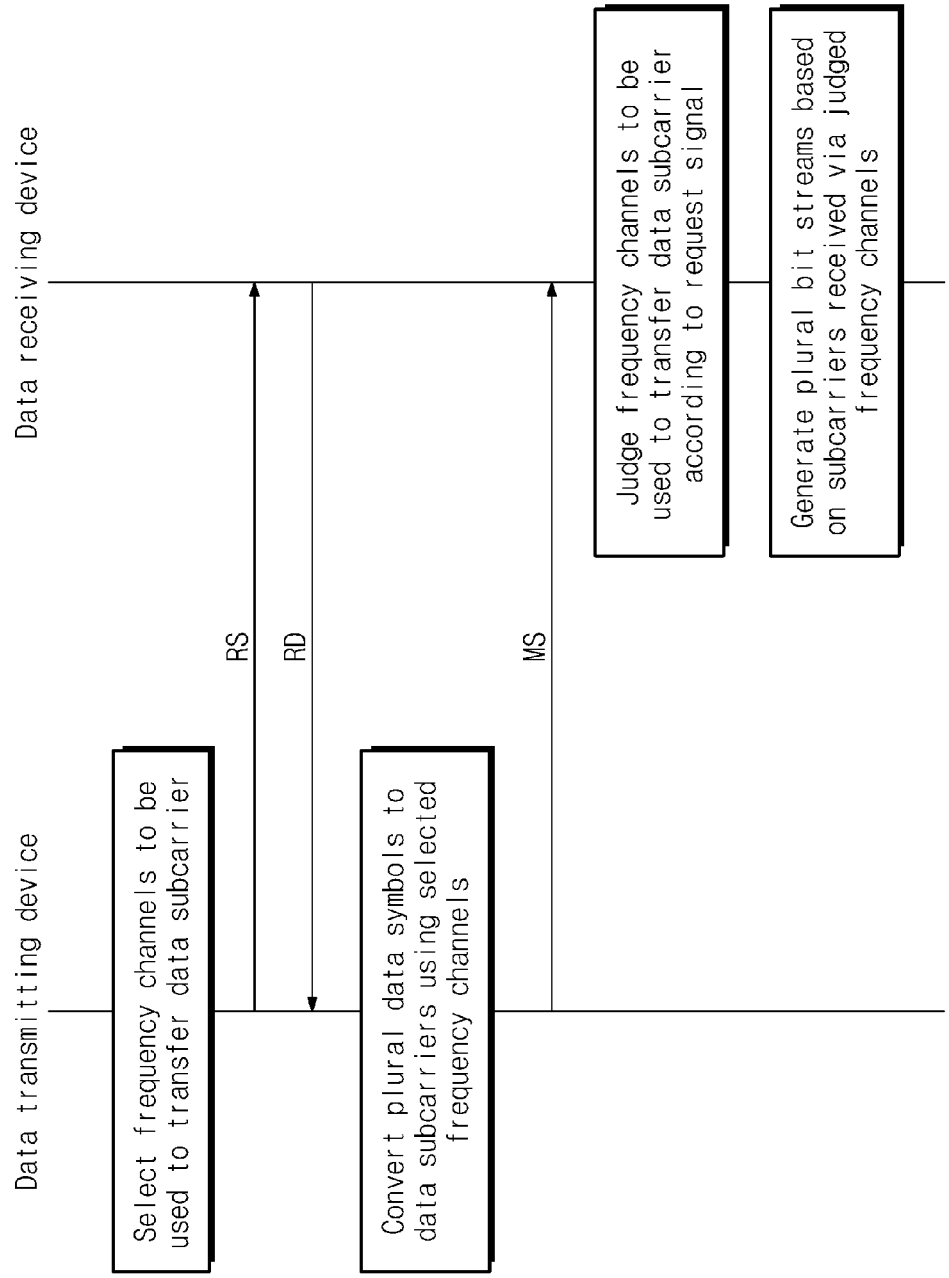
FIG. 31 is a diagram describing an operating method of a data transmitting device and a data receiving device.

FIG. 31 is a diagram describing an operating method of a data transmitting device and a data receiving device. Referring to FIGS. 16, 29, and 31, a data transmitting device 1000 may select frequency channels to be used to transfer data subcarriers according to a detection result of a detection block 110. The data transmitting device 1000 may generate a request signal RS including information on selected frequency channels. A data receiving device 4000 may send a ready signal RD to the data transmitting device in response to a request signal RS. The data receiving device 4000 may further comprise a transmission unit (not shown). The ready signal RD may be sent to the data transmitting device 1000 via the transmission unit according to the control of a control unit 4800 of the data receiving device 4000.

If the ready signal RD is received, the data transmitting device 1000 may convert a plurality of data symbols to data subcarriers on the basis of selected frequency channels. The data transmitting device 1000 may generate a plurality of subcarriers by performing inverse Fourier transform on null signals together with a plurality of data symbols according to the OFDM manner. The generated subcarriers may include a data subcarrier. The data transmitting device 1000 may send a main signal MS including the plurality of subcarriers to the data receiving device 4000.

The data receiving device 4000 may judge frequency channels to be used to transfer a data subcarrier according to a request signal RS. When the main signal MS is received, the data receiving device 4000 may generate a plurality of bit streams based on subcarriers received via the judged frequency channels.

In example embodiments, a data transmitting device and a data receiving device according to an embodiment of the inventive concept may be used for a wireless communication that is used at a medical apparatus. For example, the data transmitting device and the data receiving device according to an embodiment of the inventive concept may be used for a wireless communication that uses an MICS band. However, the inventive concept is not limited thereto.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A data transmitting device comprising:
an input symbol mapping unit converting serial data symbols to parallel data symbols and generating null signals;
a conversion unit converting the parallel data symbols and the null signals to a plurality of subcarriers and a plurality of null subcarriers respectively using sub frequency bands overlapped with one another;
a detection block detecting a frequency band occupied at an exterior; and
a control unit sending number information of the parallel data symbols to the input symbol mapping unit according to a number of the sub frequency bands corresponding to the detected frequency band,
wherein the control unit generates the number information of the parallel data symbols by subtracting a number of frequency channels corresponding to the detected frequency band from a number of frequency channels corresponding to frequency band for transmission,
wherein the input symbol mapping unit decides a number of the parallel data symbols according to the number information received from the control unit, and converts the serial data symbols to the parallel data symbols according to the number information,
wherein the conversion unit includes input points, respectively, corresponding to the overlapped sub frequency bands, and converts signals received via the input points using the overlapped sub frequency bands, respectively,
wherein the input symbol mapping unit transfers a null signal to an input point corresponding to the detected frequency band,
wherein the parallel data symbols are converted using sub frequency bands separated from one another, and
wherein the parallel data symbols and the null signals are converted such that main lobes of the plurality of subcarriers are not overlapped.

2. The data transmitting device of claim 1, wherein the main lobes of the plurality of subcarriers and the main lobes of the plurality of null subcarriers are disposed in turn.

3. The data transmitting device of claim 1, wherein the input symbol mapping unit sends the null signals to a part of input points other than an input point corresponding to the detected frequency band, and sends the parallel data symbols to a part of the remaining input points other than the input point corresponding to the detected frequency band.

4. The data transmitting device of claim 1, wherein the plurality of null subcarriers and the plurality of subcarriers are orthogonal.

5. The data transmitting device of claim 1, wherein the separated sub frequency bands correspond to MICS (Medical Implant Communication Service) frequency channels, respectively.

6. The data transmitting device of claim 1, further comprising:
a side lobe removing unit reducing an absolute value of the amplitude of an orthogonal frequency division multiplexing (OFDM) symbol formed of the plurality of subcarriers and the plurality of null subcarriers.

7. A data transmitting device comprising:
a detection block detecting a frequency band, occupied at an exterior, from among frequency channels; and
a data transmitting block converting data symbols according to an orthogonal frequency division multiplexing (OFDM) manner to generate subcarriers,
wherein the data transmitting block comprises:
an input symbol mapping unit converting serial data symbols to parallel data symbols and generating null signals;
a conversion unit converting the parallel data symbols and the null signals to a plurality of subcarriers and a plurality of null subcarriers, respectively, using sub frequency bands overlapped with one another; and
a control unit sending number information of the parallel data symbols to the input symbol mapping unit according to a number of the sub frequency bands corresponding to the detected frequency band,
wherein the control unit generates the number information of the parallel data symbols by subtracting a number of frequency channels corresponding to the detected frequency band from a number of frequency channels corresponding to frequency band for transmission,
wherein the input symbol mapping unit decides a number of the parallel data symbols according to the number information received from the control unit, and converts the serial data symbols to the parallel data symbols according to the number information, and
wherein the data transmitting block generates the subcarriers using sub frequency bands excepting the detected frequency band, the data symbols and null signals being together converted such that main lobes of the subcarriers corresponding to the data symbols are not overlapped.

8. The data transmitting device of claim 7, wherein the data transmitting block performs inverse Fourier transform on the data symbols to generate the subcarriers, and the data transmitting block further generates null subcarriers by performing inverse Fourier transform on the null signals.

9. The data transmitting device of claim 7, wherein the subcarriers are placed at separated sub frequency bands that correspond to MICS (Medical Implant Communication Service) frequency channels, respectively.

10. A data transmitting method comprising:
detecting a frequency band, occupied at an exterior, from among frequency channels;
converting a plurality of data symbols to a plurality of subcarriers according to an orthogonal frequency division multiplexing (OFDM) manner; and
transmitting the plurality of subcarriers,
wherein the converting the plurality of data symbols comprises:
generating number information of parallel data symbols by subtracting a number of frequency channels corresponding to the detected frequency band from a number of frequency channels corresponding to frequency band for transmission; and
converting serial data symbols to the parallel data symbols according to the number information,
wherein the plurality of data symbols are converted to the plurality of subcarriers using separated frequency channels, and
wherein the plurality of data symbols are converted such that main lobes of the subcarriers are not overlapped.

11. The data transmitting method of claim 10, wherein the plurality of data symbols are converted to the plurality of subcarriers using the remaining frequency channels of the separated frequency channels, other than a frequency channel corresponding to the detected frequency band.

12. The data transmitting method of claim 11, further comprising:
sending information on the remaining frequency channels to a receiver before the plurality of subcarriers are sent.

13. The data transmitting method of claim 10, wherein converting a plurality of data symbols includes converting null signals and the plurality of data symbols according to the OFDM manner to generate the plurality of subcarriers and null subcarriers.

14. The data transmitting method of claim 13, wherein sub frequency bands of the plurality of subcarriers and sub frequency bands of the null subcarriers are overlapped, and the sub frequency bands of the plurality of subcarriers are not overlapped.

* * * * *